US008896736B2

(12) United States Patent　　　(10) Patent No.:　　US 8,896,736 B2
Kobayashi　　　(45) Date of Patent:　　Nov. 25, 2014

(54) SOLID-STATE IMAGING DEVICE, IMAGING APPARATUS AND SIGNAL READING METHOD HAVING PHOTOELECTRIC CONVERSION ELEMENTS THAT ARE TARGETS FROM WHICH SIGNALS ARE READ IN THE SAME GROUP

(71) Applicant: Olympus Corporation, Tokyo (JP)

(72) Inventor: Kenji Kobayashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 46 days.

(21) Appl. No.: 13/689,414

(22) Filed: Nov. 29, 2012

(65) Prior Publication Data

US 2013/0141618 A1　　Jun. 6, 2013

(30) Foreign Application Priority Data

Dec. 2, 2011　(JP) .................................. 2011-264941

(51) Int. Cl.
  *H04N 3/14*　　(2006.01)
  *H04N 5/335*　　(2011.01)
  *H04N 5/232*　　(2006.01)
  *H04N 5/3745*　　(2011.01)
  *H04N 5/345*　　(2011.01)

(52) U.S. Cl.
  CPC ....... *H04N 5/23241* (2013.01); *H04N 5/37457* (2013.01); *H04N 5/3745* (2013.01); *H04N 5/3458* (2013.01)
  USPC .......................................... 348/308; 348/302

(58) Field of Classification Search
  CPC ..... H04N 5/341; H04N 5/345; H04N 5/3456; H04N 5/3458; H04N 5/3742; H04N 5/3745; H04N 5/37452

USPC .......................... 348/302, 305, 308, 303, 322
  See application file for complete search history.

(56) References Cited

U.S. PATENT DOCUMENTS

| 5,355,165 | A  | * | 10/1994 | Kosonocky et al. | .......... 348/311 |
| 7,990,424 | B2 | * | 8/2011  | Chiba et al.     | .............. 348/220.1 |
| 8,269,838 | B2 | * | 9/2012  | Sugawa et al.    | ............. 348/208.1 |
| 8,456,885 | B2 | * | 6/2013  | Tolmie et al.    | ................. 365/115 |
| 8,541,731 | B2 | * | 9/2013  | Sugawa et al.    | ............. 250/208.1 |
| 8,569,805 | B2 | * | 10/2013 | Sugawa et al.    | ................ 257/225 |

(Continued)

FOREIGN PATENT DOCUMENTS

JP　　2008048313 A　*　2/2008
JP　　2010-263526 A　　11/2010

(Continued)

*Primary Examiner* — John Villecco
(74) *Attorney, Agent, or Firm* — Westerman, Hattori, Daniels & Adrian, LLP

(57) ABSTRACT

A solid-state imaging device includes a pixel unit in which pixels each including a photoelectric conversion element and a signal accumulation circuit are arranged in a matrix shape and a plurality of pixels in a range of two or more rows form the same group, and a control unit that performs control to associate a plurality of photoelectric conversion elements that are targets from which signals are read in the same group with a plurality of signal accumulation circuits in the same group of an array having a number of rows smaller than a number of rows in an array of the plurality of photoelectric conversion elements, transfer signals generated by the plurality of photoelectric conversion elements to the signal accumulation circuits associated with the respective photoelectric conversion elements, and output the signals accumulated in the signal accumulation circuits for each row.

15 Claims, 22 Drawing Sheets

(56) References Cited

U.S. PATENT DOCUMENTS

| | | | |
|---|---|---|---|
| 8,570,416 B2 * | 10/2013 | Araki et al. | 348/308 |
| 2003/0052983 A1 * | 3/2003 | Altree | 348/308 |
| 2003/0206236 A1 * | 11/2003 | Levantovsky | 348/310 |
| 2007/0285544 A1 * | 12/2007 | Yamada et al. | 348/294 |
| 2008/0036889 A1 * | 2/2008 | Yamada et al. | 348/294 |
| 2010/0208115 A1 * | 8/2010 | Sugawa et al. | 348/308 |
| 2010/0245647 A1 * | 9/2010 | Honda et al. | 348/308 |
| 2011/0085066 A1 * | 4/2011 | Sugawa et al. | 348/302 |
| 2011/0176045 A1 * | 7/2011 | Ahn et al. | 348/308 |
| 2013/0107093 A1 * | 5/2013 | Aoki | 348/302 |
| 2013/0141620 A1 * | 6/2013 | Nakajima | 348/302 |
| 2013/0161487 A1 * | 6/2013 | Sakaguchi et al. | 250/208.1 |
| 2013/0182161 A1 * | 7/2013 | Nakajima | 348/300 |
| 2013/0229560 A1 * | 9/2013 | Kondo | 348/308 |
| 2013/0308023 A1 * | 11/2013 | Sugawa et al. | 348/294 |

FOREIGN PATENT DOCUMENTS

| | | | |
|---|---|---|---|
| JP | 2011071958 A | * | 4/2011 |
| JP | 2012248952 A | * | 12/2012 |
| JP | 2013009301 A | * | 1/2013 |
| JP | 2013121058 A | * | 6/2013 |
| JP | 2013138406 A | * | 7/2013 |
| WO | WO 2009150828 A1 | * | 12/2009 |

* cited by examiner

CONNECTED TO COLUMN PROCESSING UNIT

FIG. 22
PRIOR ART

SOLID-STATE IMAGING DEVICE, IMAGING APPARATUS AND SIGNAL READING METHOD HAVING PHOTOELECTRIC CONVERSION ELEMENTS THAT ARE TARGETS FROM WHICH SIGNALS ARE READ IN THE SAME GROUP

BACKGROUND OF THE INVENTION

1. Field of the Invention

The present invention relates to a solid-state imaging device and an imaging apparatus in which pixels each having a photoelectric conversion element are arranged in a matrix shape. Further, the present invention relates to a signal reading method of reading signals from the pixels.

This application claims the benefits of Japanese Patent Application No. 2011-264941, filed Dec. 2, 2011, the disclosure of which is hereby incorporated herein by references in its entirety.

2. Description of the Related Art

An imaging apparatus such as a digital still camera that converts light to an electrical signal and outputs an image signal uses a solid-state imaging device as an image generation unit that generates an image. In recent years, as the number of pixels and the frame rate has increased in the field of solid-state imaging devices, there is a need for technology to realize high-speed reading. Further, there is a need for technology to achieve low power consumption.

As a type of solid-state imaging device, there is a CMOS (including MOS)-type image sensor (hereinafter described as a "CMOS image sensor") that can be manufactured through the same process used to manufacture a CMOS integrated circuit. The CMOS image sensor has a configuration in which, for each pixel, charges are converted into an electrical signal and the electrical signals read from the pixels are processed in parallel in each pixel column. Through the parallel processing in each pixel column, the reading speed for pixel signals can be improved.

In recent years, a demand for high-speed imaging is increasing. In an image sensor, this demand is satisfied by reducing the number of readings (the number of rows/the number of lines) in a vertical direction. One example of a method of reducing the number of readings in the vertical direction includes a method called interlaced scanning in which pixels are skipped in a certain row period.

Further, when a method disclosed in Japanese Unexamined Patent Application, First Publication No. 2010-263526 is used, the number of readings in the vertical direction can be reduced more than in normal interlaced scanning. As a result, pixel signals can be read at a high speed. In a CMOS image sensor shown in Japanese Unexamined Patent Application, First Publication No. 2010-263526, a plurality of systems of driving signal lines for simultaneously driving a plurality of pixels in a row direction are provided in one row. Alternatively, in a CMOS image sensor shown in Japanese Unexamined Patent Application, First Publication No. 2010-263526, a plurality of systems of vertical signal lines that transfer pixel signals output from the pixels in a vertical direction are provided in one column. In order to input a pixel signal to a column processing unit provided in each column, the CMOS image sensor selects one of a plurality of rows for each column and outputs a pixel signal from the selected row. Accordingly, column processing of pixel signals of a plurality of rows can be performed through column processing once.

For example, a case in which pixel signals are read from only pixels 400 and 401 among pixels constituting a Bayer array illustrated in FIG. 21 is considered. In FIG. 21, Gr and Gb indicate green pixels. Rr indicates a red pixel. Bb indicates a blue pixel. The color of each pixel corresponds to a color of a color filter arranged on each pixel.

When reading of the pixel signals is performed, first, the pixels 400 in first and second rows are selected. The pixel signals output from the pixels 400 are then input to a column processing unit of each column. After the pixel signals output from the pixels 400 are processed by the column processing unit, pixels 401 of fifth and sixth rows are selected. The pixel signals output from the pixels 401 are then input to the column processing unit of each column. The pixel signals output from the pixels 401 are processed by the column processing unit. Accordingly, the pixel signals of the two rows are simultaneously read per four rows. Since column processing of a plurality of rows of pixel signals is performed through one column process, the pixel signals can be read at a high speed.

In the solid-state imaging device disclosed in Japanese Unexamined Patent Application, First Publication No. 2010-263526, a configuration in which a plurality of systems of driving signal lines are provided in one row has been adopted. The solid-state imaging device is configured to select only the pixels 400 among pixels of the first and second rows and read pixel signals, as illustrated in FIG. 21. Further, the solid-state imaging device is configured to select only the pixels 401 among pixels of the fifth and sixth rows and read pixel signals, as illustrated in FIG. 21. Alternatively, in the solid-state imaging device disclosed in Japanese Unexamined Patent Application, First Publication No. 2010-263526, a configuration in which a plurality of systems of vertical signal lines are provided in one column has been adopted.

SUMMARY OF THE INVENTION

According to a first aspect of the present invention, a solid-state imaging device includes a pixel unit and a control unit. In the pixel unit, pixels each including a photoelectric conversion element and a signal accumulation circuit are arranged in a matrix shape. In the pixel unit, a plurality of pixels in a range of two or more rows form a single group. The control unit associates a plurality of photoelectric conversion elements that are targets from which signals are read in the same group with a plurality of signal accumulation circuits in the same group of an array having a number of rows smaller than the number of rows in an array of the plurality of photoelectric conversion elements. The control unit transfers signals generated by the plurality of photoelectric conversion elements to the signal accumulation circuits associated with the respective photoelectric conversion elements. The control unit performs control to output the signals accumulated in the signal accumulation circuits for each row.

According to a second aspect of the present invention, the control unit associates a plurality of first photoelectric conversion elements that are targets from which signals are read in the same group with a plurality of first signal accumulation circuits in the same group of an array having a number of rows smaller than the number of rows of an array of the plurality of first photoelectric conversion elements. The control unit transfers signals generated by the plurality of first photoelectric conversion elements to the first signal accumulation circuits associated with the plurality of respective first photoelectric conversion elements. The control unit associates a plurality of second photoelectric conversion elements other than the plurality of first photoelectric conversion elements in the same group with a plurality of second signal accumulation circuits in the same group of an array having a number of rows smaller than the number of rows in an array of the plurality of second photoelectric conversion elements. The control unit transfers signals generated by the plurality of second photoelectric conversion elements to the second signal accumulation circuit associated with the plurality of respective second photoelectric conversion elements. The control unit performs control to output the signals accumulated in the first signal accumulation circuits for each row.

According to a third aspect of the present invention, the control unit does not perform output of the signals accumulated in the second signal accumulation circuits.

According to a fourth aspect of the present invention, the control unit associates the plurality of photoelectric conversion elements with one of the plurality of signal accumulation circuits. The control unit transfers the signals generated by the plurality of photoelectric conversion elements to the one signal accumulation circuit associated with the plurality of photoelectric conversion elements.

According to a fifth aspect of the present invention, the control unit adds the signals generated by the plurality of photoelectric conversion elements. The control unit transfers the added signal to the one signal accumulation circuit associated with the plurality of photoelectric conversion elements.

According to a sixth aspect of the present invention, the photoelectric conversion element generates a signal corresponding to any one of a plurality of colors. The added signal corresponds to the same color.

According to a seventh aspect of the present invention, the array of the pixels corresponds to a Bayer array including first green, second green, red and blue. The control unit associates the photoelectric conversion elements arranged in two rows and two columns that are targets from which signals are read in the same group with the signal accumulation circuit arranged in one row and four columns in the same group. The control unit transfers the signals generated by the photoelectric conversion elements arranged in two rows and two columns to the signal accumulation circuits arranged in one row and four columns associated with the respective photoelectric conversion elements. The control unit outputs the signals accumulated in the signal accumulation circuits for each row.

According to an eighth aspect of the present invention, the photoelectric conversion elements arranged in two rows and two columns include two photoelectric conversion elements corresponding to the first green and the red arranged in the first row, and two photoelectric conversion elements corresponding to the blue and the second green arranged in the second row. The signal accumulation circuits arranged in one row and four columns include four signal accumulation circuits corresponding to the first green, the red, the blue and the second green.

According to a ninth aspect of the present invention, a first substrate and a second substrate are electrically connected by a connection part. The photoelectric conversion elements are arranged in the first substrate. The signal accumulation circuits are arranged in the second substrate. The control unit associates the plurality of photoelectric conversion elements that are targets from which signals are read in the same group with the plurality of signal accumulation circuits in the same group of an array having a number of rows smaller than the number of rows in an array of the plurality of photoelectric conversion elements. The control unit transfers the signals generated by the plurality of photoelectric conversion elements to the signal accumulation circuits associated with the respective photoelectric conversion elements via the connection part. The control unit performs control to output the signals accumulated in the signal accumulation circuits for each row.

According to a tenth aspect of the present invention, the pixel further includes an amplification circuit that amplifies the signal generated by the photoelectric conversion element. The signal accumulation circuit accumulates an amplification signal amplified by the amplification circuit.

According to an eleventh aspect of the present invention, the control unit is configured to perform first control and second control. In the first control, a plurality of first photoelectric conversion elements that are targets from which signals are read in the same group are associated with a plurality of first signal accumulation circuits in the same group of an array having a number of rows smaller than a number of rows of an array of the plurality of first photoelectric conversion elements. In the first control, signals generated by the plurality of first photoelectric conversion elements are transferred to the first signal accumulation circuits associated with the respective first photoelectric conversion elements. In the second control, a plurality of second photoelectric conversion elements that are targets from which signals are read in the same group are associated with a plurality of second signal accumulation circuits in the same group of an array having a number of rows smaller than a number of rows in an array of the plurality of second photoelectric conversion elements. In the second control, signals generated by the plurality of second photoelectric conversion elements are transferred to the second signal accumulation circuits associated with the respective second photoelectric conversion elements. When the first control and the second control are performed, the second control related to one frame starts after the first control related to one frame starts and before the first control related to one frame ends.

According to a twelfth aspect of the present invention, the control unit performs the first control and the second control so that a period in which the signal generated by the first photoelectric conversion element is transferred to the first signal accumulation circuit and a period in which the signal generated by the second photoelectric conversion element is transferred to the second signal accumulation circuit do not overlap.

According to a thirteenth aspect of the present invention, the control unit resets the first photoelectric conversion element in relation to reading of a signal of a first frame. Then, the control unit performs control to transfer the signal generated by the second photoelectric conversion element to the second signal accumulation circuit in relation to reading of a signal of a second frame in a period until the signal generated by the first photoelectric conversion element is transferred to the first signal accumulation circuit, and control to reset the second photoelectric conversion element in relation to reading of a signal of a third frame.

According to a fourteenth aspect of the present invention, an imaging apparatus includes a pixel unit and a control unit. In the pixel unit, pixels each including a photoelectric conversion element and a signal accumulation circuit are arranged in a matrix shape. A plurality of pixels in a range of two or more rows form the same group. The control unit associates a plurality of photoelectric conversion elements that are targets from which signals are read in the same group with a plurality of signal accumulation circuits in the same group of an array having a number of rows smaller than a number of rows in an array of the plurality of photoelectric conversion elements. The control unit transfers signals generated by the plurality of photoelectric conversion elements to the signal accumulation circuits associated with the respective photoelectric conversion elements. The control unit performs control to output the signals accumulated in the signal accumulation circuits for each row.

According to a fifteenth aspect of the present invention, a signal reading method is a signal reading method of reading signals from pixels of a solid-state imaging device, the solid-state imaging device including a pixel unit in which pixels each including a photoelectric conversion element and a signal accumulation circuit are arranged in a matrix shape and a plurality of pixels in a range of two or more rows form the same group, the method including a generating step, a transferring step, and an outputting step. In the generating step, signals are generated by a plurality of photoelectric conversion elements that are targets from which signals are read in the same group. In the transferring step, the plurality of photoelectric conversion elements are associated with a plurality of signal accumulation circuits in the same group of an array having a number of rows smaller than a number of rows in an array of the plurality of photoelectric conversion elements, and the signals generated by the plurality of photoelectric conversion elements are transferred to the signal accumulation circuits associated with the respective photoelectric conversion elements. In the outputting step, the signals accumulated in the signal accumulation circuits are output for each row.

BRIEF DESCRIPTION OF THE DRAWINGS

Figure 22:
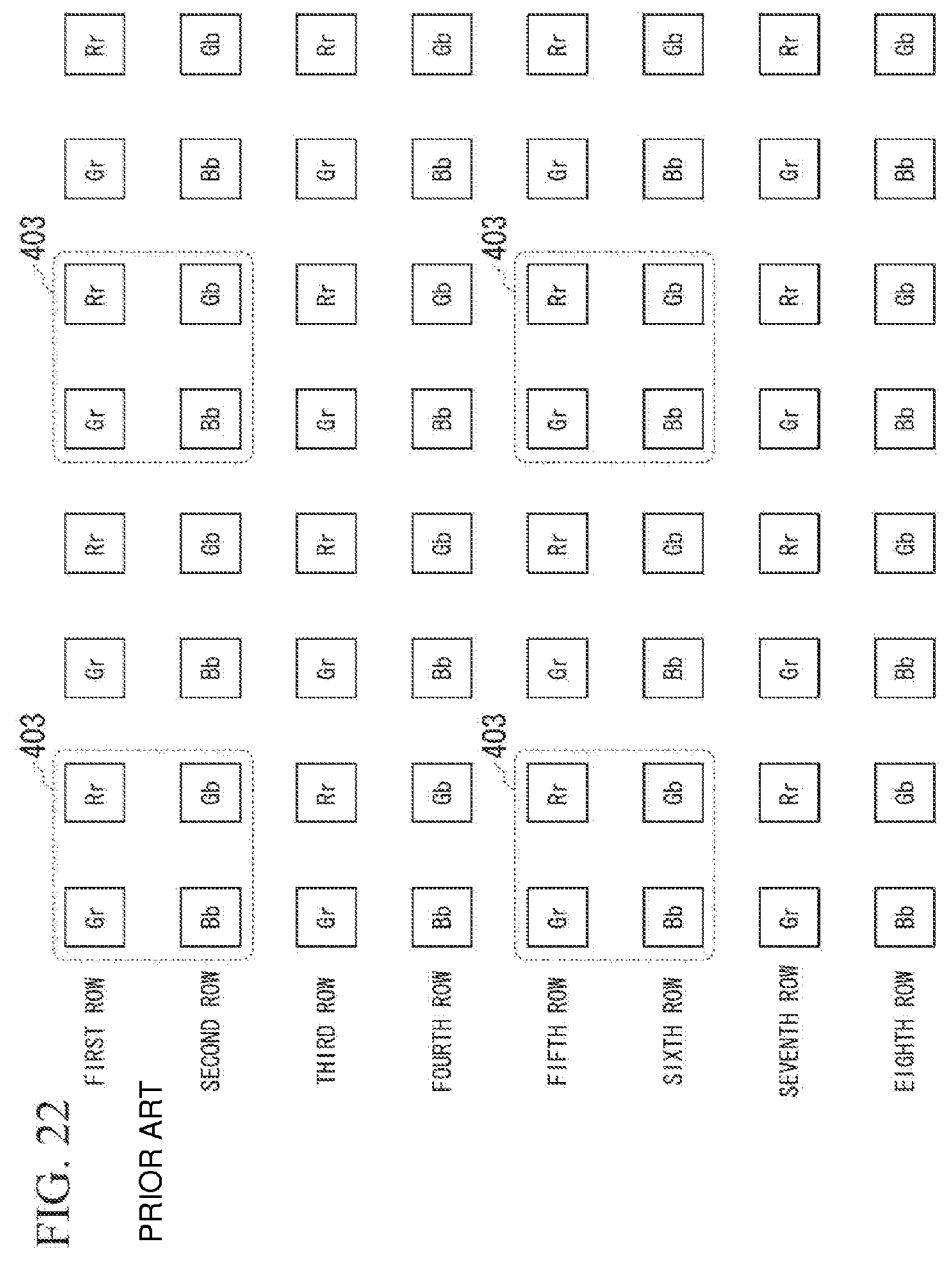

FIG. 22 is a diagram illustrating a method of reading a pixel signal in a conventional solid-state imaging device.

DETAILED DESCRIPTION OF THE INVENTION

Hereinafter, embodiments of the present invention will be described with reference to the drawings.

The following description includes specific detailed contents as an example. However, those skilled in the art should, of course, understand that the detailed contents may be varied or modified and the variations and modifications of the contents are within the scope of the present invention. Accordingly, various exemplary embodiments to be described below will be described without loss of generality of the present invention described in the claims and without limitation on the present invention.

(First Embodiment)

Figure 1:
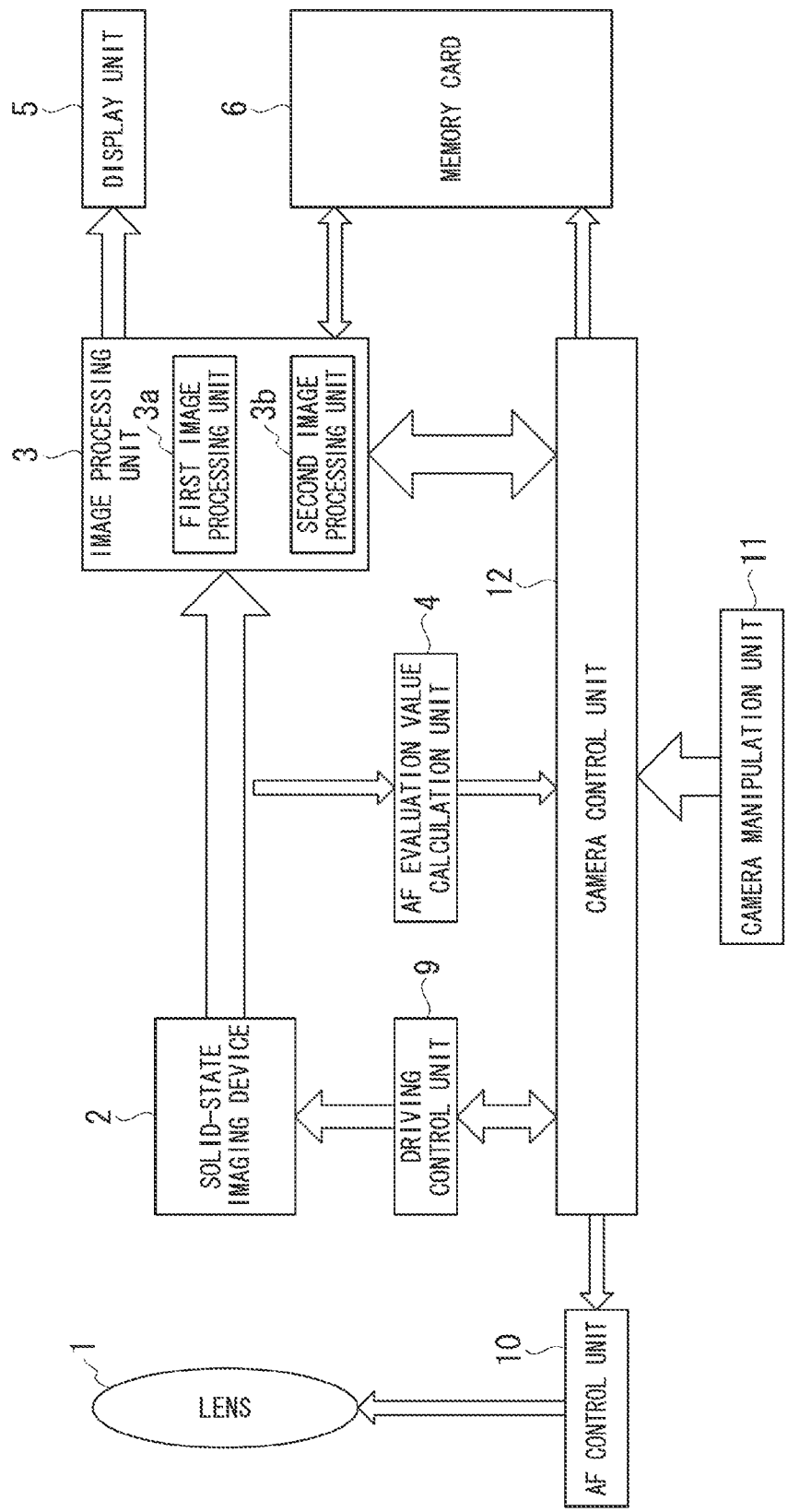
FIG. 1 is a block diagram illustrating a configuration of an imaging apparatus according to a first embodiment of the present invention.

First, a first embodiment of the present invention will be described. FIG. 1 illustrates a configuration of an imaging apparatus according to the present embodiment. The imaging apparatus according to one aspect of the present invention may be an electronic device having an imaging function. The imaging apparatus may be, for example, a digital video camera, an endoscope or the like, as well as a digital still camera. The imaging apparatus illustrated in FIG. 1 includes a lens 1, a solid-state imaging device 2, an image processing unit 3, an AF evaluation value calculation unit 4, a display unit 5, a driving control unit 9, an AF control unit 10, a camera manipulation unit 11, and a camera control unit 12. Further, a memory card 6 is also described in FIG. 1. The memory card 6 is detachable from the imaging apparatus, and thus the memory card 6 may not be a configuration specific to the imaging apparatus.

From a point of view of hardware, the respective blocks illustrated in FIG. 1 include various parts, such as electrical circuit parts such as a CPU, a memory and the like of a computer, an optical part such as a lens, and a manipulation part such as a button or a switch. From a point of view of software, the respective blocks include a computer program or the like. In FIG. 1, functional blocks including both hardware and software are drawn. Accordingly, the functional blocks may be configured in various forms by a combination of hardware and software.

The lens 1 is a photographing lens for forming an optical image of a subject on a pixel unit 24 of the solid-state imaging device 2. The solid-state imaging device 2 performs photoelectric conversion on the optical image of the subject formed by the lens 1 to generate a pixel signal. The solid-state imaging device 2 converts the pixel signal into a digital image signal and outputs the converted image signal, as will be described below.

The image processing unit 3 performs various types of digital image processing on the image signal output from the solid-state imaging device 2. The image processing unit 3 includes a first image processing unit 3a and a second image processing unit 3b. The first image processing unit 3a processes, for recording, an image signal for a still image. The second image processing unit 3b processes, for display, an image signal for live view (an image signal for a moving image).

The AF evaluation value calculation unit 4 calculates an AF evaluation value indicating a degree of focus on the subject based on the image signal output from the solid-state imaging device 2 (e.g., a luminance signal or luminance-equivalent signal in the image signal). The AF evaluation value calculated by the AF evaluation value calculation unit 4 is output to the camera control unit 12.

The display unit 5 displays an image based on the image signal that is image-processed for display by the second image processing unit 3b of the image processing unit 3. The display unit 5 can reproduce and display a still image. Further, the display unit 5 may perform the live view display. In the live view display, an image in an imaging range is displayed in real time in synchronization with an imaging operation.

The memory card 6 is a recording medium for holding a signal that is image-processed for recording by the first image processing unit 3a of the image processing unit 3. The driving control unit 9 performs driving control of the solid-state imaging device 2 based on an instruction from the camera control unit 12. The AF control unit 10 drives a focus lens included in the lens 1 based on control performed by the camera control unit 12 having received the AF evaluation value. The AF evaluation value is calculated by the AF evaluation value calculation unit 4. The AF control unit performs control to drive the focus lens and focus a subject image formed by the solid-state imaging device 2.

The camera manipulation unit 11 includes various manipulation members for enabling a user to perform various manipulation inputs with respect to the imaging apparatus. The camera manipulation unit 11 outputs a signal based on a result of a manipulation input to the camera control unit 12. Examples of the manipulation members included in the camera manipulation unit 11 include a power switch, a release button, a photographing mode switch, a white balance mode switch, and an AF mode switch. The power switch is used to power the imaging apparatus on/off. The release button includes a two-step push button for inputting an instruction to capture a still image. The photographing mode switch is used to switch a photographing mode between a single photographing mode and a continuous photographing mode. The white balance mode switch is used to adjust white balance. The AF mode switch is used to switch the AF mode between a single AF mode and a continuous AF mode.

The camera control unit 12 controls the entire imaging apparatus, including the image processing unit 3, the memory card 6, the driving control unit 9, the AF control unit 10 and the like, based on the AF evaluation value from the AF evaluation value calculation unit 4, the manipulation input from the camera manipulation unit 11 or the like. Operation of the camera control unit 12 is defined by a program stored in a ROM embedded in the imaging apparatus. The camera control unit 12 reads the program and performs various controls according to content defined by the program.

Figure 2:
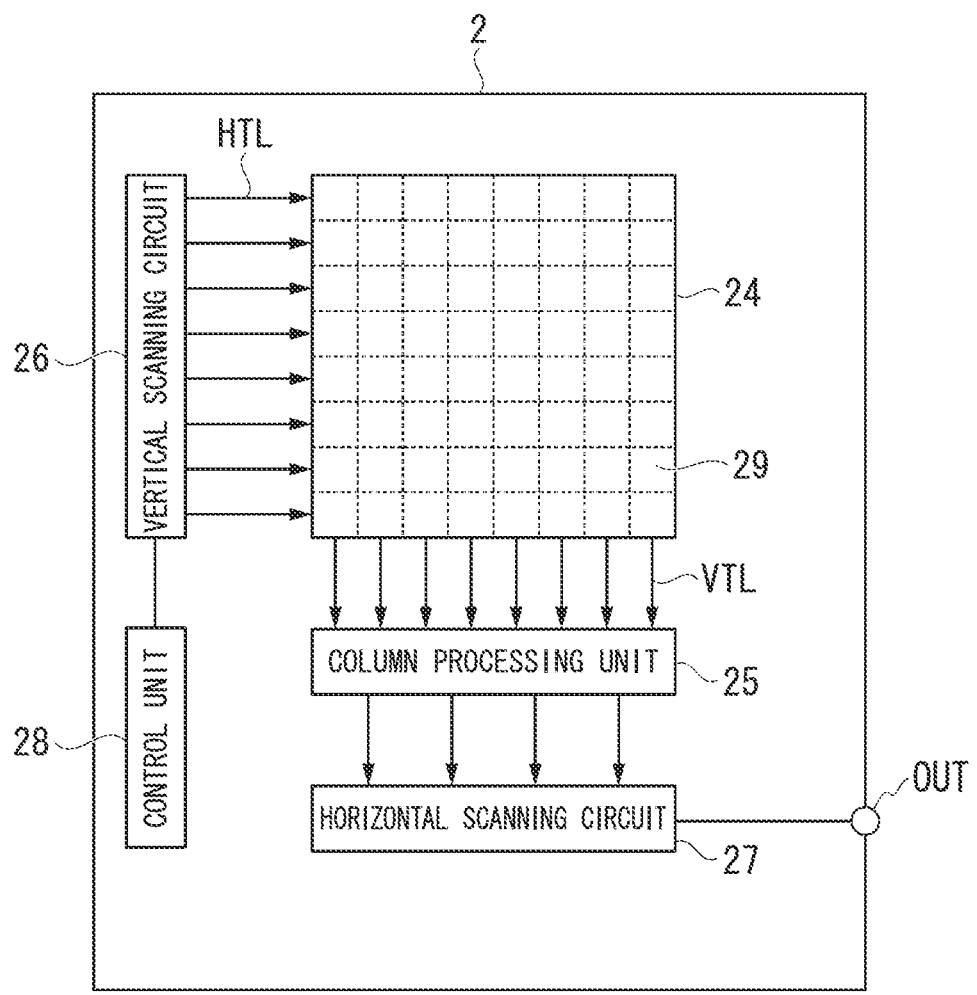
FIG. 2 is a block diagram illustrating a configuration of a solid-state imaging device according to the first embodiment of the present invention.

FIG. 2 illustrates a configuration of the solid-state imaging device 2 in the present embodiment. The solid-state imaging device 2 includes a pixel unit 24, a column processing unit 25, a vertical scanning circuit 26, a horizontal scanning circuit 27, and a control unit 28.

The pixel unit 24 includes a plurality of pixels 29 arranged in a two-dimensional shape of a row direction and a column direction. The pixel 29 converts the optical image of the subject formed by the lens 1 into a pixel signal through photoelectric conversion. The pixel 29 outputs the pixel signal to the column processing unit 25 via the vertical signal line VTL provided in each column based on control that is performed by the control unit 28 via the vertical scanning circuit 26. In FIG. 2, 64 pixels 29 are arranged in eight rows and eight columns. However, an array of the pixels shown in FIG. 2 is one example, and the number of rows and the number of columns may be two or more.

The column processing unit 25 performs predetermined signal processing on the pixel signal output from the pixel unit 24 to the vertical signal line VTL, and temporarily holds the pixel signal after signal processing. Specifically, the column processing unit performs, for example, signal processing such as noise removal based on CDS (Correlated Double Sampling), signal amplification, and AD (analog-digital) conversion on the pixel signal of the unit pixel. Through the noise removal process, a fixed pattern noise specific to the pixel such as variation of a threshold value of the amplification transistor is removed. Further, the signal processing illustrated therein is only one example and the signal processing is not limited thereto.

The vertical scanning circuit 26 includes a shift register, an address decoder, or the like. The vertical scanning circuit 26 performs driving control of the pixels 29 of the pixel unit 24 in units of rows. A reset operation, an accumulation operation, a signal reading operation or the like of the pixels 29 is included in the driving control. In order to perform the driving control, the vertical scanning circuit 26 outputs a driving control pulse (a control signal) to the respective pixels 29 via a control signal line group HTL including a plurality of control signal lines. Then, the vertical scanning circuit 26 independently controls the pixels 29 in each row. As the vertical scanning circuit 26 performs the driving control, the pixel signal is output from the pixel 29 to the vertical signal line VTL. The horizontal scanning circuit 27 sequentially outputs pixel signals corresponding to one row output from the column processing unit 25, in a horizontal direction, to read the pixel signals. The read pixel signal is output from the output terminal OUT to the outside of the solid-state imaging device 2.

The control unit 28 receives data indicating an operation mode or the like given from the driving control unit 9 outside the solid-state imaging device 2. The control unit 28 performs the driving control of the vertical scanning circuit 26 based on the data. Operation of the control unit 28 is defined by a program stored in a ROM embedded in the solid-state imaging device 2. The control unit 28 reads the program. The control unit 28 then performs various controls according to content defined by the program and the data given from the driving control unit 9.

Figure 3:
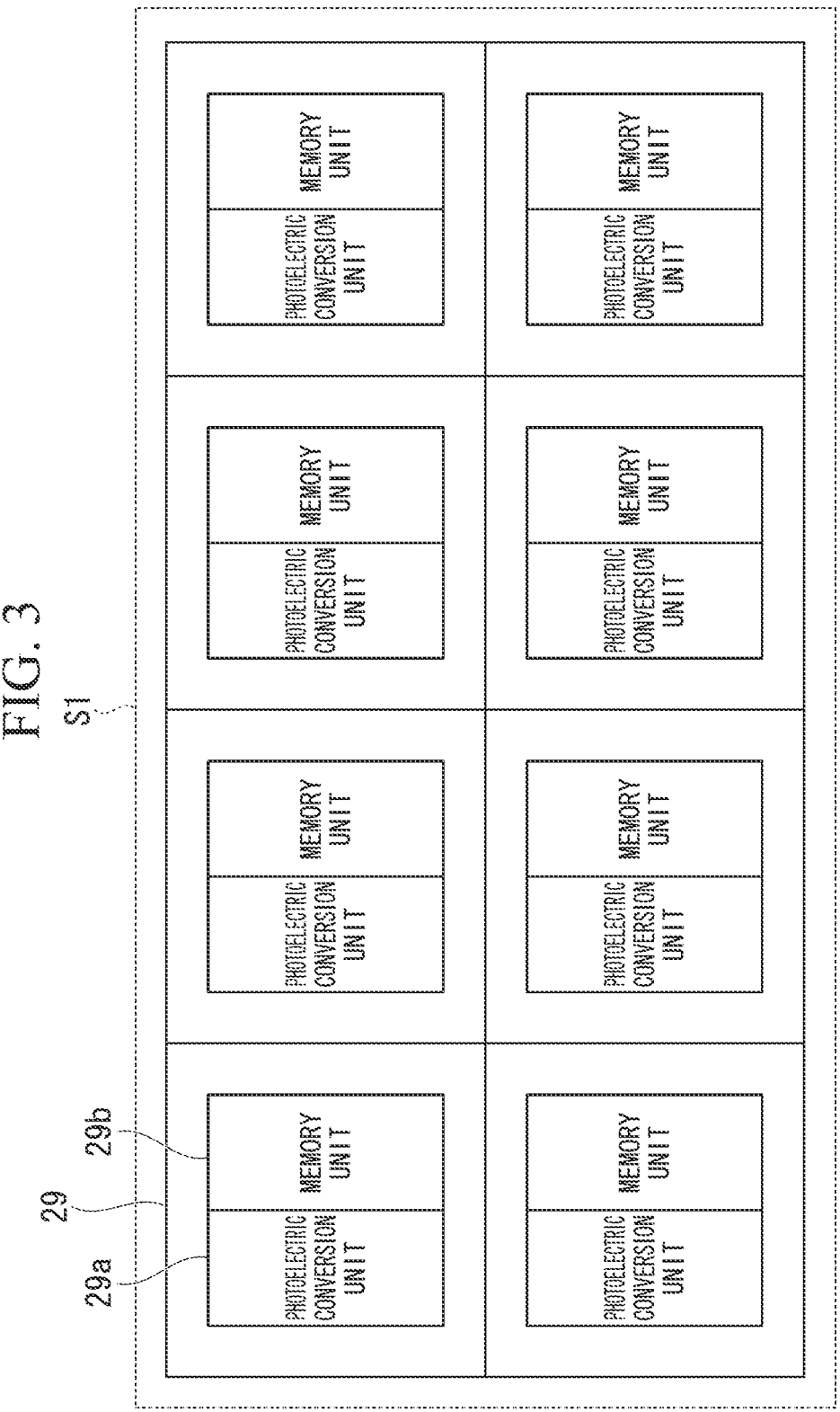
FIG. 3 is a diagram illustrating a configuration of a pixel unit included in the solid-state imaging device according to the first embodiment of the present invention.

FIG. 3 schematically illustrates a configuration of a part of the pixel unit 24. In FIG. 3, only the pixels 29 corresponding to two rows and four columns among the pixels 29 in the pixel unit 24 are illustrated. The pixels 29 are arranged in a matrix shape on a plane of a substrate of the solid-state imaging device 2. The pixel 29 includes a photoelectric conversion unit 29a and a memory unit 29b. In the pixel 29, the photoelectric conversion unit 29a and the memory unit 29b are arranged in a horizontal direction. An array of the photoelectric conversion unit 29a and the memory unit 29b illustrated in FIG. 3 is one example and is not limited thereto.

The plurality of pixels 29 in the pixel unit 24 are classified into a plurality of groups. In the present embodiment, the group is referred to as a shared pixel group. One shared pixel group includes a plurality of pixels 29 in a range of two or more rows. In the example illustrated in FIG. 3, one shared pixel group S1 includes eight pixels 29 in two rows and four columns. The photoelectric conversion unit 29a and the memory unit 29b are electrically connected. Signal delivery is performed between the photoelectric conversion unit 29a and the memory unit 29b. The photoelectric conversion unit 29a of the pixel 29 included in the one shared pixel group is connected to the memory units 29b of the other pixels 29 included in the same shared pixel group, as well as to the memory unit 29b of the same pixel 29.

Figure 4:
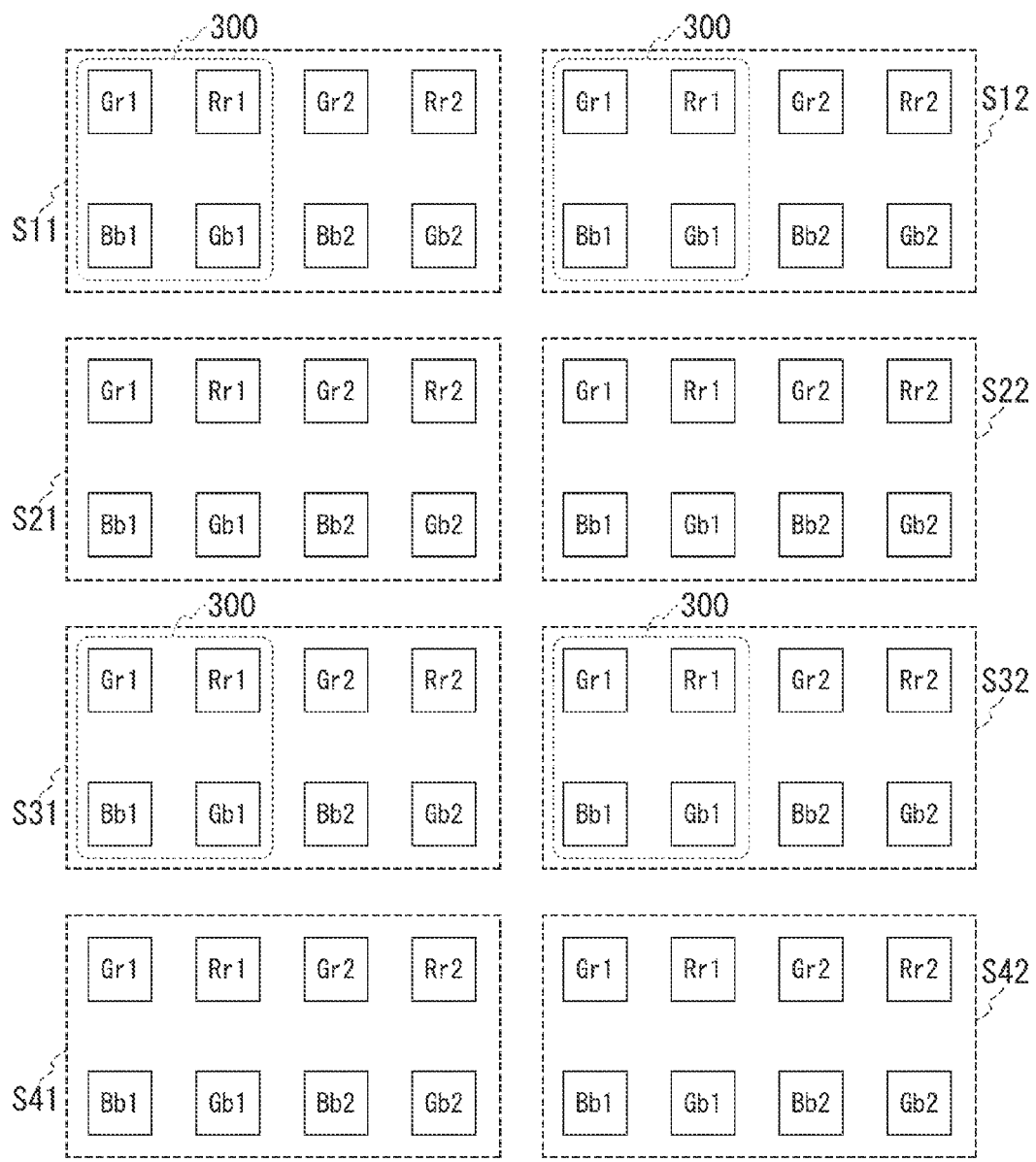
FIG. 4 is a diagram illustrating an array of photoelectric conversion units of the pixel unit included in the solid-state imaging device according to the first embodiment of the present invention.
Figure 5:
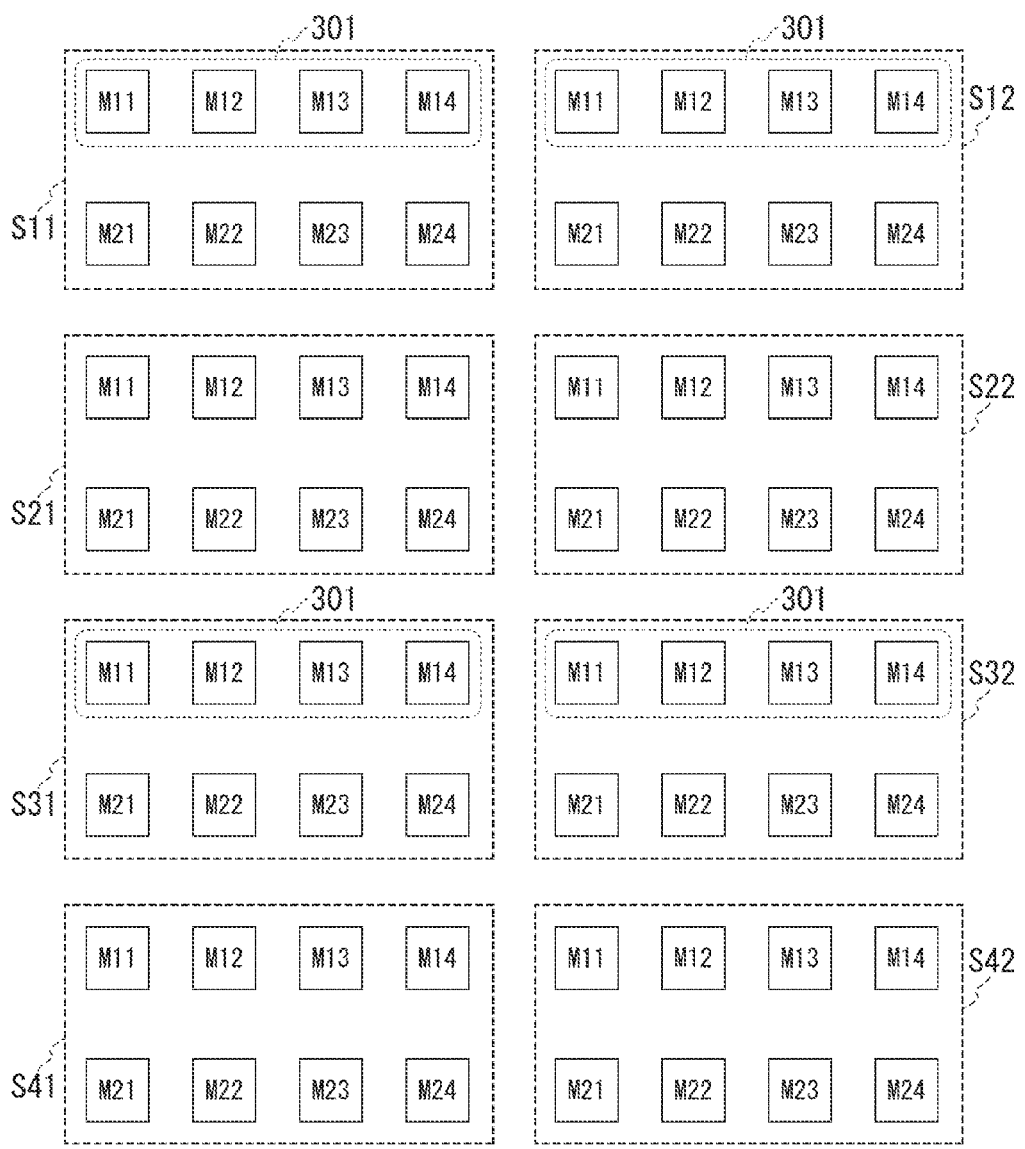
FIG. 5 is a diagram illustrating an array of memory units of the pixel unit included in the solid-state imaging device according to the first embodiment of the present invention.

FIG. 4 schematically illustrates an array of the photoelectric conversion units 29a. FIG. 5 schematically illustrates an array of the memory units 29b. FIG. 4 illustrates the array of the photoelectric conversion units 29a viewed from one direction (e.g., a light incidence direction) in a plane. FIG. 5 illustrates an array of memory units 29b viewed from one direction in a plane (e.g., the light incidence direction). That is, FIGS. 4 and 5 illustrate a case in which the units are viewed from the same direction. Shared pixel groups S11, S12, S21, S22, S31, S32, S41, and S42 are provided in respective corresponding positions of the array of photoelectric conversion units 29a and the array of the memory units 29b. The photoelectric conversion unit 29a and the memory unit 29b correspond to the pixel 29 included in the shared pixel group S11. That is, signal charges generated by a photoelectric conversion element of the photoelectric conversion unit 29a within the pixel 29 included in the shared pixel group S11 are output to the memory unit 29b. The same applies to a correspondence relationship of the photoelectric conversion unit 29a and the memory unit 29b in the other shared pixel groups S12, S21, S22, S31, S32, S41, and S42.

As illustrated in FIG. 4, each of the shared pixel groups S11, S12, S21, S22, S31, S32, S41, and S42 includes photoelectric conversion units Rr1, Rr2, Bb1, Bb2, Gr1, Gr2, Gb1 and Gb2 as the photoelectric conversion units 29a. Each of the photoelectric conversion units Rr1 and Rr2 has a color filter that selectively transmits red light. Each of the photoelectric conversion units Bb1 and Bb2 has a color filter that selectively transmits blue light. Each of the photoelectric conversion units Gr1 and Gr2, Gb1, and Gb2 has a color filter that selectively transmits green light. The photoelectric conversion units Gr1 and Gr2 are arranged in the same row as the photoelectric conversion units Rr1 and Rr2. The photoelectric conversion units Gb1 and Gb2 are arranged in the same row as the photoelectric conversion units Bb1 and Bb2. The photoelectric conversion units Rr1, Rr2, Bb1, Bb2, Gr1, Gr2, Gb1 and Gb2 are arranged according to a so-called Bayer array format.

As illustrated in FIG. 5, each of the shared pixel groups S11, S12, S21, S22, S31, S32, S41, and S42 includes memory units M11, M12, M13, M14, M21, M22, M23 and M24 as the memory units 29b. As described above, the photoelectric conversion units 29a (the photoelectric conversion units Rr1, Rr2, Bb1, Bb2, Gr1, Gr2, Gb1 and Gb2) and the memory units 29b (the memory units M11, M12, M13, M14, M21, M22, M23 and M24) included in the same shared pixel group have a correspondence relationship.

Further, FIGS. 4 and 5 illustrate a pixel that is a target that generates and outputs a pixel signal (an output target pixel) at the time of generation of a decimated image. The decimated image includes pixel signals read from some decimated pixels. An output target pixel 300 of FIG. 4 and an output target pixel 301 of FIG. 5 are output target pixels of the present embodiment. Each of the output target pixels 300 and 301 includes four pixels 29. The output target pixel 300 includes pixels 29 in two rows and two columns. The output target pixel 300 includes photoelectric conversion units Rr1, Bb1, Gr1, and Gb1. The output target pixel 301 includes pixels 29 in one row and four columns. The output target pixel 301 includes memory units M11, M12, M13 and M14. The output target pixel 300 and the output target pixel 301 included in the same shared pixel group have a correspondence relationship. That is, signal charges generated by the photoelectric conversion elements of the photoelectric conversion units Rr1, Bb1, Gr1, and Gb1 of the output target pixel 300 are output to the memory units M11, M12, M13, and M14 of the output target pixel 301 included in the same shared pixel group as the shared pixel group including the output target pixel 300.

Figure 6:
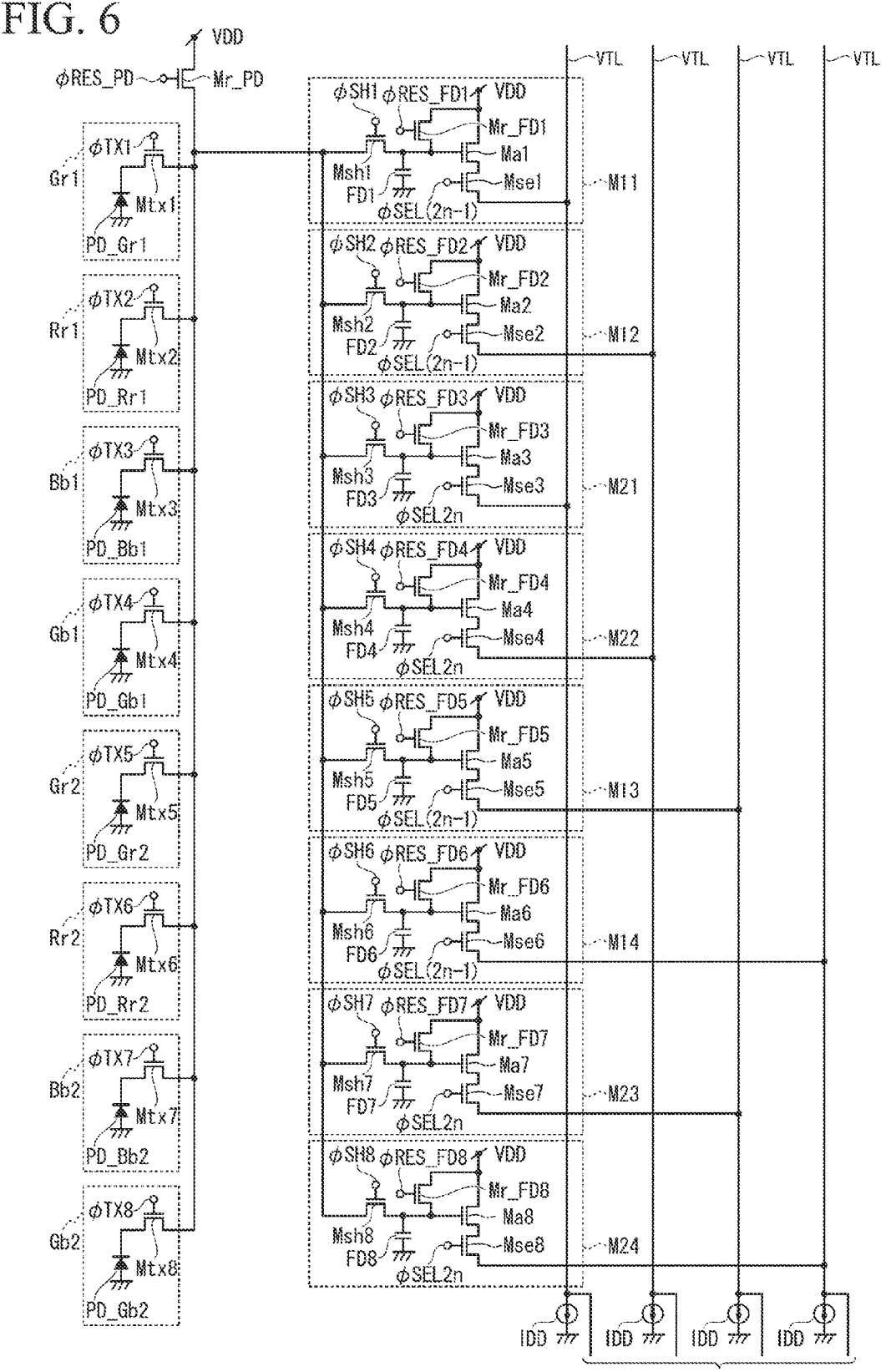
FIG. 6 is a circuit diagram illustrating a configuration of a shared pixel group included in the solid-state imaging device according to the first embodiment of the present invention.
Figure 7:
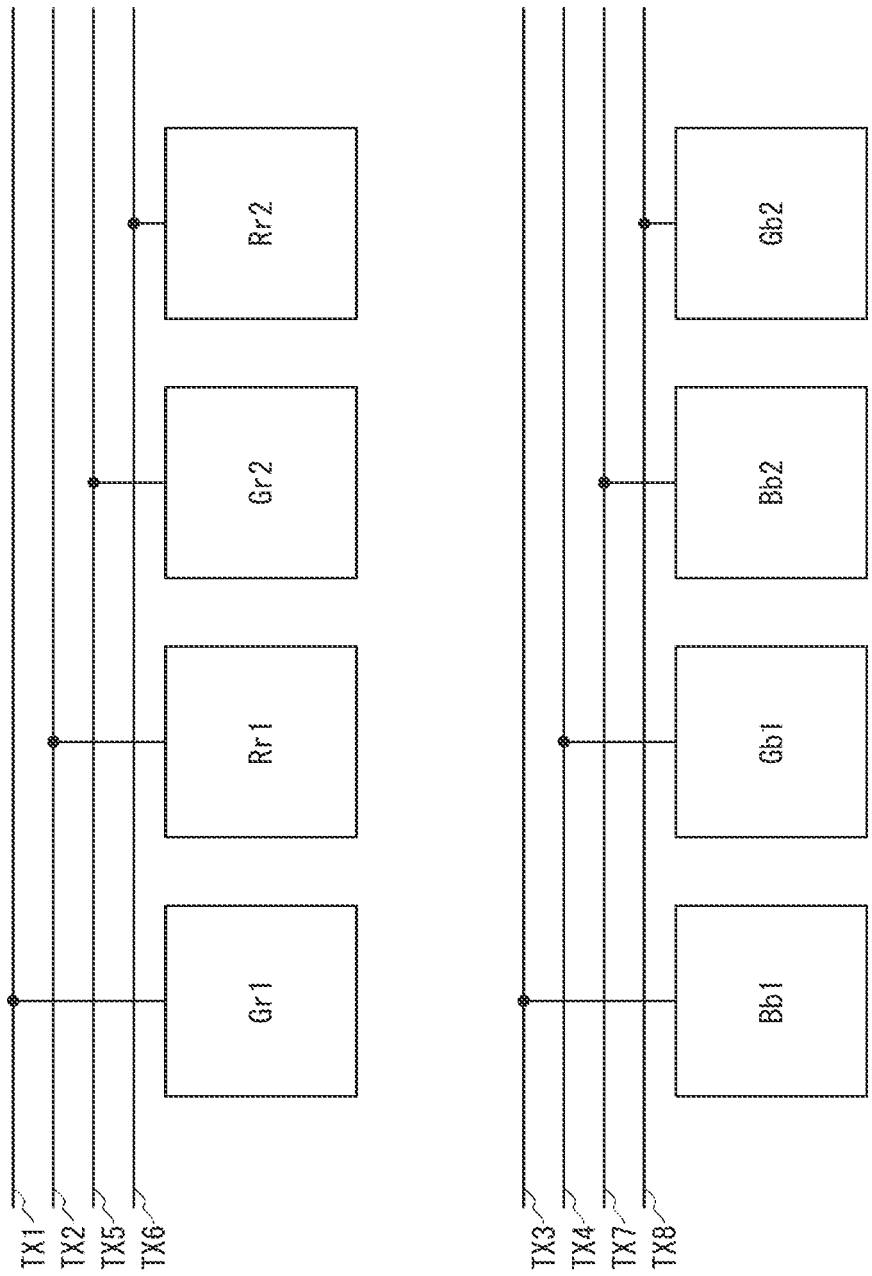
FIG. 7 is a diagram illustrating control signal lines that supply a driving control pulse to the photoelectric conversion unit included in the solid-state imaging device according to the first embodiment of the present invention.
Figure 8:
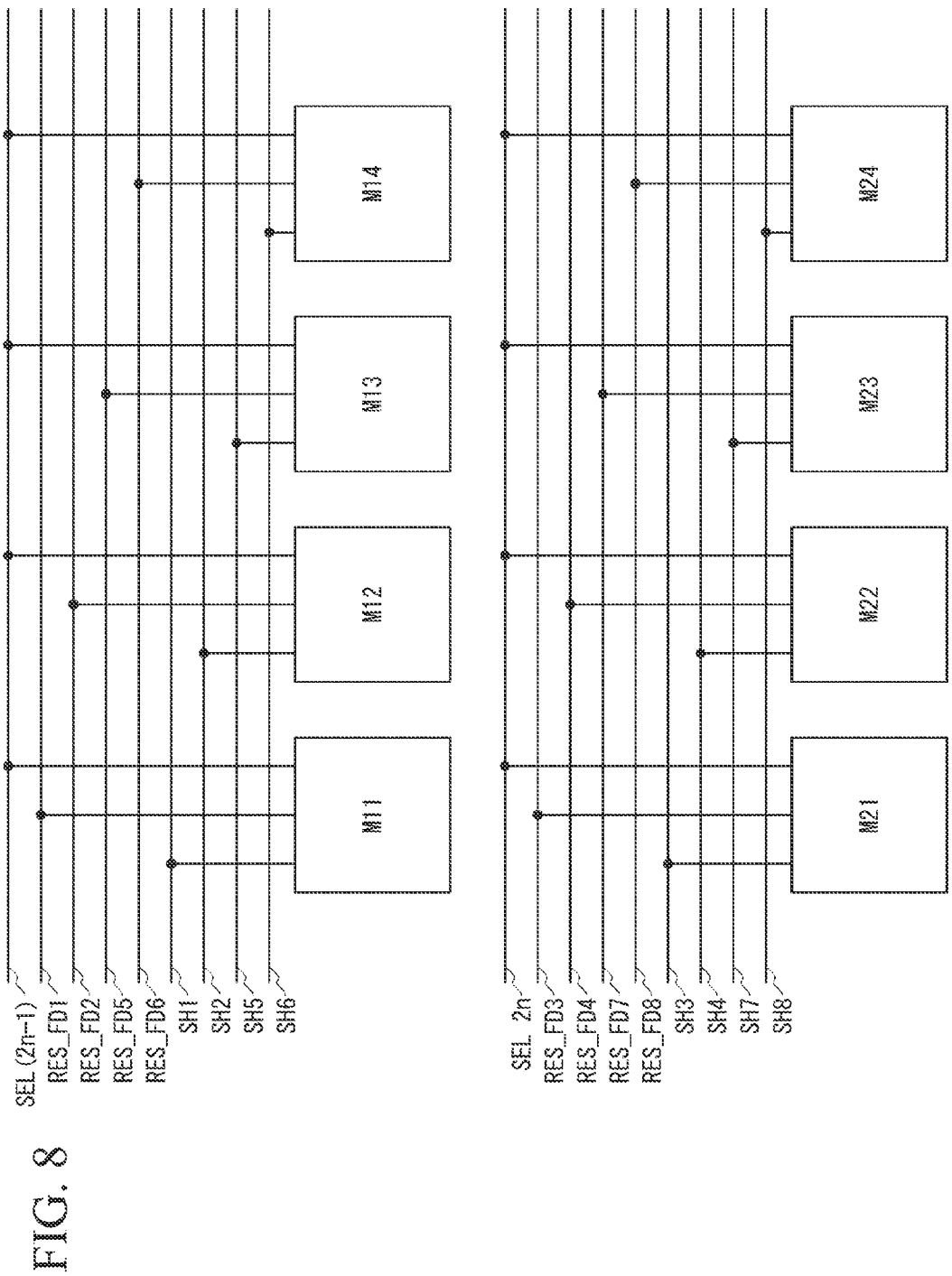
FIG. 8 is a diagram illustrating control signal lines that supply a driving control pulse to the memory unit included in the solid-state imaging device according to the first embodiment of the present invention.

FIG. 6 illustrates a circuit configuration of one shared pixel group. FIGS. 7 and 8 illustrate control signal lines that supply a driving control pulse to the pixel 29. The shared pixel group includes photoelectric conversion units Gr1, Rr1, Bb1, Gb1, Gr2, Rr2, Bb2 and Gb2, a PD reset transistor Mr_PD, and memory units M11, M12, M21, M22, M13, M14, M23, and M24.

The photoelectric conversion units Gr1, Rr1, Bb1, Gb1, Gr2, Rr2, Bb2 and Gb2 include photoelectric conversion elements PD_Gr1, PD_Rr1, PD_Bb1, PD_Gb1, PD_Gr2, PD_Rr2, PD_Bb2, and PD_Gb2, and transfer transistors Mtx1 to Mtx8, respectively. The PD reset transistor Mr_PD is shared by the eight photoelectric conversion units Gr1, Rr1, Bb1, Gb1, Gr2, Rr2, Bb2 and Gb2.

One terminal of each of the photoelectric conversion elements PD_Gr1, PD_Rr1, PD_Bb1, PD_Gb1, PD_Gr2, PD_Rr2, PD_Bb2, and PD_Gb2 is grounded. Drain terminals of transfer transistors Mtx1 to Mtx8 are connected to the other terminals of the photoelectric conversion elements PD_Gr1, PD_Rr1, PD_Bb1, PD_Gb1, PD_Gr2, PD_Rr2, PD_Bb2, and PD_Gb2. Gate terminals of the transfer transistors Mtx1 to Mtx8 are connected to the vertical scanning circuit 26 via transfer signal lines TX1 to TX8 illustrated in FIG. 7. Transfer pulses ϕTX1 to ϕTX8 are supplied to the gate terminals of the transfer transistors Mtx1 to Mtx8.

A drain terminal of the PD reset transistor Mr_PD is connected to a supply voltage VDD. A source terminal of the PD reset transistor Mr_PD is connected to the source terminals of the transfer transistors Mtx1 to Mtx8. A gate terminal of the PD reset transistor Mr_PD is connected to the vertical scanning circuit 26. A reset pulse ϕRES_PD is supplied to the gate terminal of the PD reset transistor Mr_PD.

The memory units M11, M12, M21, M22, M13, M14, M23, and M24 include sample-and-hold transistors Msh1 to Msh8, FD reset transistors Mr_FD1 to Mr_FD8, charge holding units FD1 to FD8, amplification transistors Ma1 to Ma8, and selection transistors Mse1 to Mse8, respectively.

Drain terminals of the sample-and-hold transistors Msh1 to Msh8 are connected to the source terminals of the transfer transistors Mtx1 to Mtx8. Gate terminals of the sample-and-hold transistors Msh1 to Msh8 are connected to the vertical scanning circuit 26 via the sample and hold signal lines SH1 to SH8 illustrated in FIG. 8. Sample and hold pulses φSH1 to φSH8 are supplied to the gate terminals of the sample-and-hold transistors Msh1 to Msh8.

A supply voltage VDD is connected to drain terminals of the FD reset transistors Mr_FD1 to Mr_FD8. Source terminals of the FD reset transistors Mr_FD1 to Mr_FD8 are connected to the source terminals of the sample-and-hold transistors Msh1 to Msh8. The gate terminals of the FD reset transistors Mr_FD1 to Mr_FD8 are connected to the vertical scanning circuit 26 via the FD reset signal lines RES_FD1 to RES_FD8 illustrated in FIG. 8. The FD reset pulses φRES_FD1 to φRES_FD8 are supplied to the gate terminals of the FD reset transistors Mr_FD1 to Mr_FD8.

One terminals of the charge holding units FD1 to FD8 are connected to the source terminals of the sample-and-hold transistors Msh1 to Msh8. The other terminals of the charge holding units FD1 to FD8 are grounded. Drain terminals of the amplification transistors Ma1 to Ma8 are connected to the supply voltage VDD. Gate terminals constituting input parts of the amplification transistors Ma1 to Ma8 are connected to the source terminals of the sample-and-hold transistors Msh1 to Msh8.

Drain terminals of the selection transistors Mse1 to Mse8 are connected to source terminals of the amplification transistors Ma1 to Ma8. Source terminals of the selection transistors Mse1 to Mse8 are connected to the vertical signal line VTL. Gate terminals of the selection transistors Mse1, Mse2, Mse5, and Mse6 of odd rows are connected to the vertical scanning circuit 26 via a selection signal line SEL(2n−1) illustrated in FIG. 8. A selection pulse φSEL(2n−1) is supplied to the gate terminals of the selection transistors Mse1, Mse2, Mse5, and Mse6. The gate terminals of the selection transistors Mse3, Mse4, Mse7, and Mse8 of even rows are connected to the vertical scanning circuit 26 via a selection signal line SEL2n illustrated in FIG. 8. A selection pulse φSEL2n is supplied to the gate terminals of the selection transistors Mse3, Mse4, Mse7, and Mse8. (2n−1) and 2n of the selection pulses φSEL(2n−1) and φSEL2n correspond to the number of rows. For each transistor described above, the polarity may be reversed. Further, the source terminals and the drain terminals may be the reverse of that indicated above.

The photoelectric conversion elements PD_Gr1, PD_Rr1, PD_Bb1, PD_Gb1, PD_Gr2, PD_Rr2, PD_Bb2, and PD_Gb2 are, for example, photodiodes. The photoelectric conversion elements PD_Gr1, PD_Rr1, PD_Bb1, PD_Gb1, PD_Gr2, PD_Rr2, PD_Bb2, and PD_Gb2 generate (produce) signal charges based on incident light and accumulate the generated (produced) signal charges. The transfer transistors Mtx1 to Mtx8 transfer the signal charges accumulated in the photoelectric conversion elements PD_Gr1, PD_Rr1, PD_Bb1, PD_Gb1, PD_Gr2, PD_Rr2, PD_Bb2, and PD_Gb2 to the charge holding units FD1 to FD8. On/off of the transfer transistors Mtx1 to Mtx8 is controlled by transfer pulses φTX1 to φTX8 from the vertical scanning circuit 26. The charge holding units FD1 to FD8 are floating diffusion capacitors. The charge holding units FD1 to FD8 temporarily hold the signal charges transferred from the photoelectric conversion elements PD_Gr1, PD_Rr1, PD_Bb1, PD_Gb1, PD_Gr2, PD_Rr2, PD_Bb2, and PD_Gb2.

The PD reset transistor Mr_PD resets the photoelectric conversion elements PD_Gr1, PD_Rr1, PD_Bb1, PD_Gb1, PD_Gr2, PD_Rr2, PD_Bb2, and PD_Gb2. On/off of the PD reset transistor Mr_PD is controlled by a reset pulse φRES_PD from the vertical scanning circuit 26. Reset of the photoelectric conversion elements PD_Gr1, PD_Rr1, PD_Bb1, PD_Gb1, PD_Gr2, PD_Rr2, PD_Bb2, and PD_Gb2 is control of an amount of the charges accumulated in the photoelectric conversion elements PD_Gr1, PD_Rr1, PD_Bb1, PD_Gb1, PD_Gr2, PD_Rr2, PD_Bb2, and PD_Gb2 to set the states (potentials) of the photoelectric conversion elements PD_Gr1, PD_Rr1, PD_Bb1, PD_Gb1, PD_Gr2, PD_Rr2, PD_Bb2, and PD_Gb2 to a reference state (a reference potential or a reset level).

The sample-and-hold transistors Msh1 to Msh8 sample and hold the signals transferred by the transfer transistors Mtx1 to Mtx8. The sample-and-hold transistors Msh1 to Msh8 are held in the charge holding units FD1 to FD8. On/off of the sample-and-hold transistors Msh1 to Msh8 is controlled by sample and hold pulses φSH1 to φSH8 from the vertical scanning circuit 26.

The FD reset transistors Mr_FD1 to Mr_FD8 reset the charge holding units FD1 to FD8. On/off of the FD reset transistors Mr_FD1 to Mr_FD8 is controlled by the FD reset pulses φRES_FD1 to φRES_FD8 from the vertical scanning circuit 26. The reset of the charge holding units FD1 to FD8 is control of an amount of charges held in the charge holding units FD1 to FD8 to set states (potentials) of the charge holding units FD1 to FD8 to a reference state (a reference potential or a reset level). The charge holding units FD1 to FD8 hold analog signals sampled and held by the sample-and-hold transistors Msh1 to Msh8.

From the source terminals, the amplification transistors Ma1 to Ma8 output the amplification signals input to the gate terminals. The amplification signals are signals amplified based on the signal charges held in the charge holding units FD1 to FD8. The amplification transistors Ma1 to Ma8 and a current source IDD connected to the vertical signal line VTL constitute a source follower circuit. The selection transistors Mse1 to Mse8 select the memory units M11, M12, M21, M22, M13, M14, M23, and M24. The selection transistors Mse1 to Mse8 send outputs of the amplification transistors Ma1 to Ma8 to the vertical signal line VTL. On/off of the selection transistors Mse1 to Mse8 is controlled by the selection pulses pφSEL(2n−1) and φSEL2n from the vertical scanning circuit 26.

Next, a method of driving the solid-state imaging device 2 in the present embodiment will be described. The driving method is a driving method for generating the decimated image. The driving method is a driving method of reading the pixel signal based on the signal charges generated by the output target pixel 300 of FIG. 4 from the output target pixel 301 of FIG. 5. Periods in which the solid-state imaging device 2 is driven include four periods of a PD reset period, an exposure period, a transfer operation period, and a read operation period. Operations of the solid-state imaging device 2 in the periods will be described in order.

Figure 9:
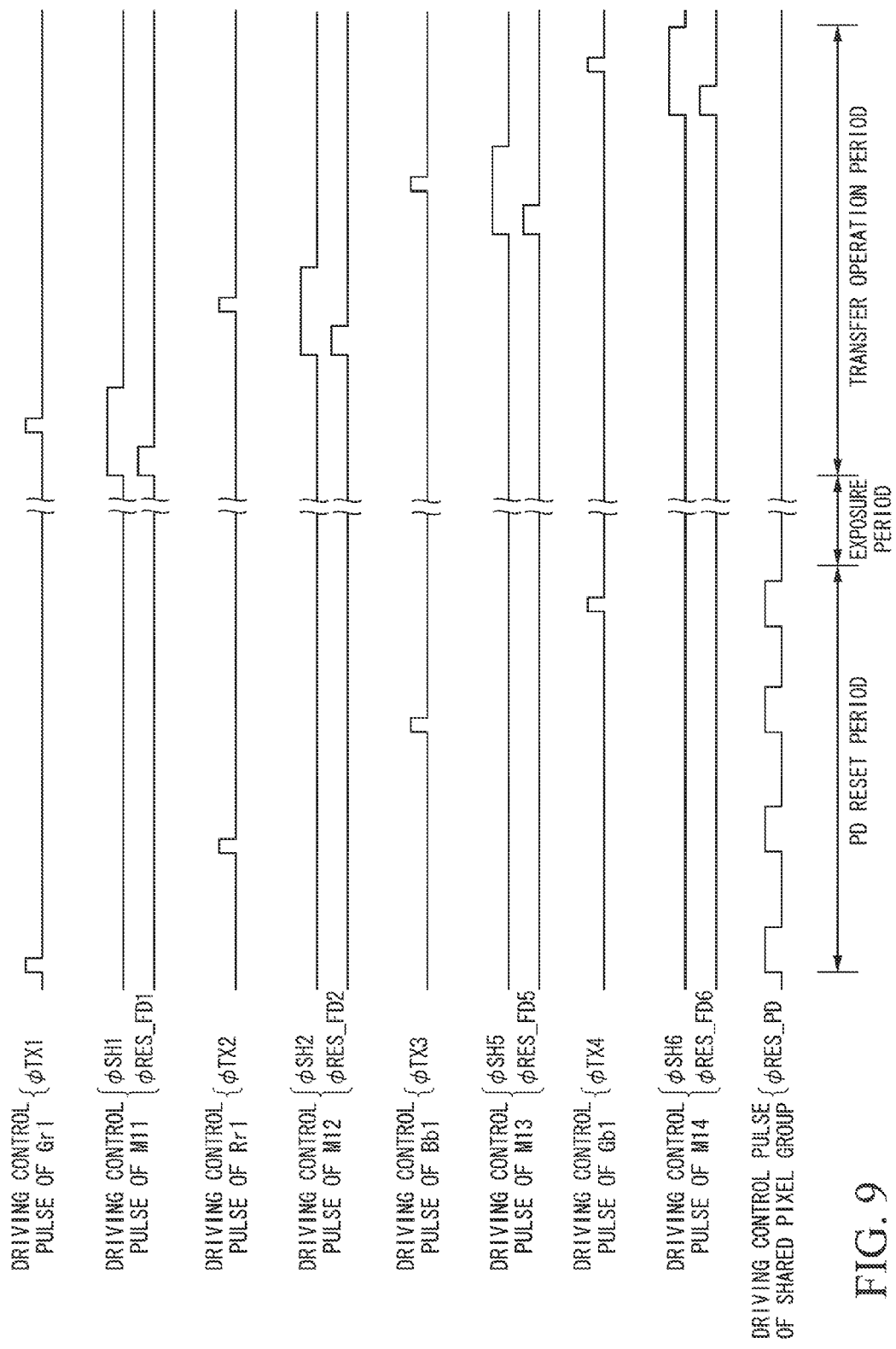
FIG. 9 is a timing chart illustrating operation of the solid-state imaging device according to the first embodiment of the present invention.

Operation of the solid-state imaging device 2 in the PD reset period, the exposure period, and the transfer operation period will be described with reference to FIG. 9. FIG. 9 illustrates driving control pulses of the photoelectric conversion unit Gr1, the memory unit M11, the photoelectric conversion unit Rr1, the memory unit M12, the photoelectric conversion unit Bb1, the memory unit M13, the photoelectric conversion unit Gb1, and the memory unit M14 in the shared pixel group, and a driving control pulse common to the shared pixel group in order from the top.

The PD reset period is a period in which reset is performed by discharging the signal charges accumulated in the photoelectric conversion elements PD_Gr1, PD_Rr1, PD_Bb1, and PD_Gb1 at the start of exposure. Operation from start of the reset to end of a signal charge transfer operation is performed at a common timing in the respective shared pixel groups. That is, the operation illustrated in FIG. 9 is performed in the shared pixel group S11 and simultaneously in the other shared pixel groups S12, S21, S22, S31, S32, S41, and S42.

Further, in this case, transfer of the signal charges in the shared pixel groups S21, S22, S41, and S42 not used to generate the decimated image is also performed. However, in the read operation period, reading of the signals held in the memory units in the shared pixel groups S21, S22, S41, and S42 is not performed, as will be described below. Accordingly, a pixel signal not used for a decimated image is not output. Exposure start times and exposure end times between the respective pixels in the shared pixel group differ due to the operation illustrated in FIG. 9. However, exposure timings of all the pixels can be substantially the same if a difference in the exposure start time and the exposure end time between the respective pixels is minimized. That is, it is possible to realize simultaneity of the exposure, as in a global shutter.

First, the PD reset pulse φRES_PD is applied to the gate terminal of the PD reset transistor Mr_PD, and the transfer pulse φTX1 is applied to the gate terminal of the transfer transistor Mtx1 to turn the PD reset transistor Mr_PD and the transfer transistor Mtx1 on. In this case, the photoelectric conversion element PD_Gr1 of the photoelectric conversion unit Gr1 is reset. Similarly, the transfer pulses φTX2, φTX3 and φTX4 and the PD reset pulse φRES_PD are sequentially applied to reset the photoelectric conversion elements PD_Rr1, PD_Bb1, and PD_Gb1 of the photoelectric conversion units Rr1, Bb1 and Gb1.

When the application of the transfer pulses φTX1, φTX2, φTX3 and φTX4 and the PD reset pulse φRES_PD is released, exposure starts. In this case, accumulation of signal charges for the photoelectric conversion elements PD_Gr1, PD_Rr1, PD_Bb1, and PD_Gb1 starts. When the above operation is completed for all the photoelectric conversion elements PD_Gr1, PD_Rr1, PD_Bb1, and PD_Gb1 in the four photoelectric conversion units Gr1, Rr1, Bb1, and Gb1 in the shared pixel group, the PD reset period ends. If a predetermined time has elapsed after the exposure starts, operation in the transfer operation period is performed.

Next, the operation in the transfer operation period will be described. The transfer operation period is a period in which the signal charges accumulated in the photoelectric conversion elements PD_Gr1, PDRr1, PD_Bb1, and PD_Gb1 after the exposure starts are transferred to the charge holding units FD1, FD2, FD5 and FD6. First, the sample and hold pulse φSH1 is applied to the gate terminal of the sample-and-hold transistor Msh1 to turn the sample-and-hold transistor Msh1 on. In this case, the charge holding unit FD1 is selected as a transfer destination for signal charges. Simultaneously, the FD reset pulse φRES_FD1 is applied to the gate terminal of the FD reset transistor Mr_FD1 to turn the FD reset transistor Mr_FD1 on. In this case, the charge holding unit FD1 is reset.

Then, the transfer pulse φTX1 is applied to the gate terminal of the transfer transistor Mtx1 to turn the transfer transistor Mtx1 on. In this case, the signal charges in the photoelectric conversion element PD_Gr1 in the photoelectric conversion unit Gr1 are transferred to and held in the charge holding unit FD1 in the memory unit M11.

Similarly, as the transfer pulses φTX2, φTX3 and φTX4, the FD reset pulses φRES_FD2, φRES_FD5, and φRES_FD6, and the sample and hold pulses pφSH2, φSH5 and φSH6 are sequentially applied, the signal charges in the photoelectric conversion elements PD_Rr1, PD_Bb1, and PD_Gb1 are transferred to and held in the charge holding units FD2, FD5 and FD6, respectively. If the above operation is completed for the photoelectric conversion units Gr1, Rr1, Bb1 and Gb1 in the shared pixel group, the transfer operation period ends.

Through the above operation, the signals accumulated in the photoelectric conversion units Gr1, Rr1, Bb1, and Gb1 are transferred to the memory units M11, M12, M13, and M14, respectively. This operation is common to all the shared pixel groups. As a result, the signals are held in the memory units M11, M12, M13, and M14 of the first, third, fifth, and seventh rows.

Next, operation of the solid-state imaging device 2 in the read operation period will be described with reference to FIG. 10.

Figure 10:
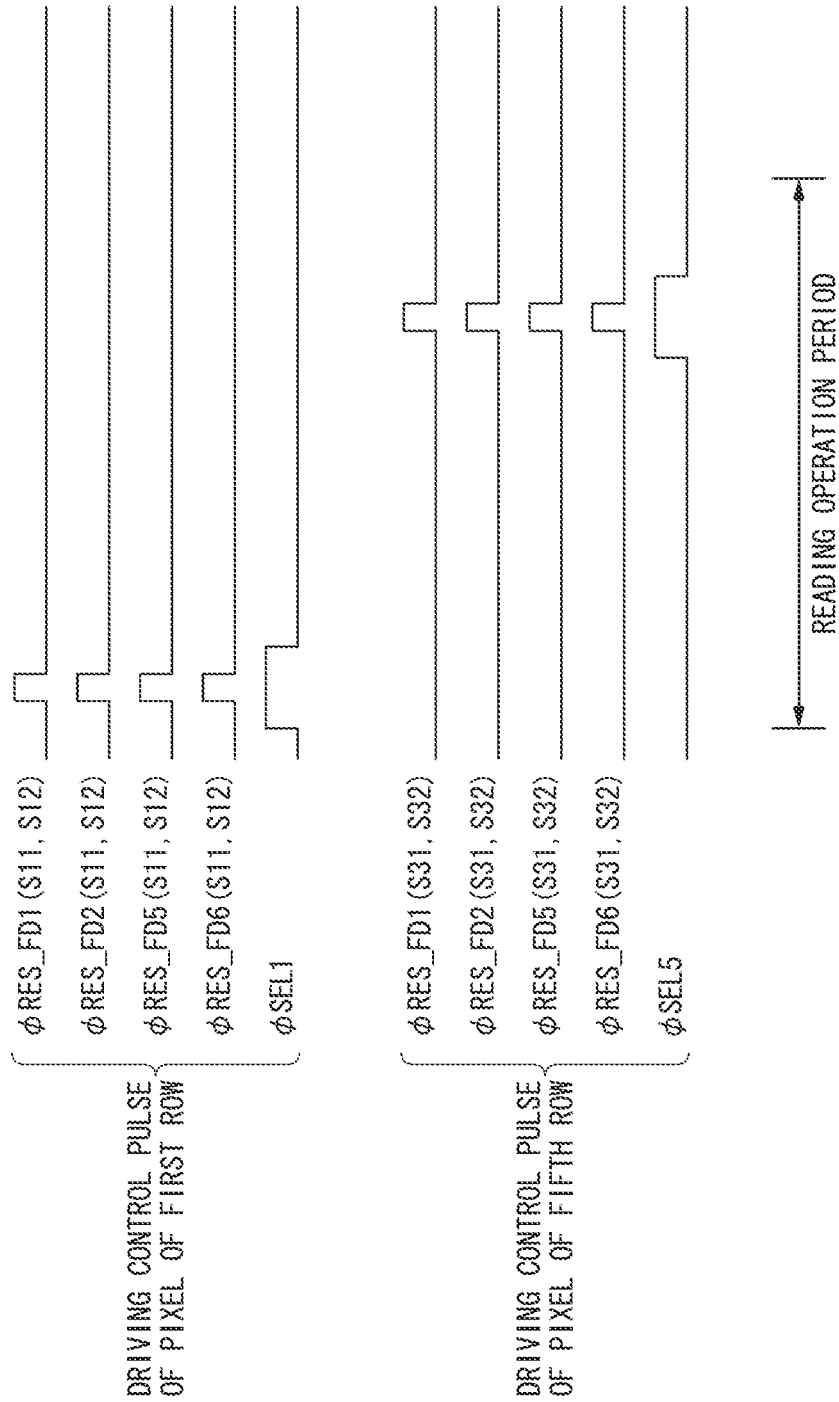
FIG. 10 is a timing chart illustrating operation of the solid-state imaging device according to the first embodiment of the present invention.

FIG. 10 illustrates driving control pulses for the memory units M11, M12, M13, and M114 arranged in the first and fifth rows in order from top. The read operation period is a period in which signals based on the signal charges held in the charge holding units FD1, FD2, FD5 and FD6 are read from the memory units M11, M12, M13, and M14. The operation in the read operation period is an operation common to the respective rows.

Further, in the read operation period, only signals in the memory units M11, M12, M13, and M14 in the output target pixels 300 and 301 of the first and fifth rows are read. In this case, signals in the memory units M11, M12, M13, and M14 in the pixels 29 of the third and seventh rows, which are not the output target pixels, are not read.

Symbols in parentheses after the FD reset pulses φRES_FD1, φRES_FD2, qφRES_FD5, and φRES_FD6 in FIG. 10 indicate the shared pixel groups to which the FD reset pulses φRES_FD1, φRES_FD2, φRES_FD5, and φRES_FD6 are applied, respectively. For example, φRES_FD2(S11, S12) indicates the FD reset pulse applied to the FD reset transistors Mr_FD2 in the shared pixel groups S11 and S12. In the read operation period, driving timings for the shared pixel groups S11 and S12 are the same. Further, driving timings for the shared pixel groups S31 and S32 are the same.

In the read operation period, reading of the pixel signals from only the memory units M11, M12, M13, and M14 of the output target pixel 301 is performed. In the present embodiment, reading of pixel signals from only the memory units M11, M12, M13, and M14 of the first and fifth rows is performed.

First, the selection pulse φSEL1 is applied to the gate terminals of the respective selection transistors Mse1, Mse2, Mse5, and Mse6 of the first row of the shared pixel groups S11 and S12 to turn the selection transistors Mse1, Mse2, Mse5, and Mse6 on. In this case, the memory units M11, M12, M13, and M14 arranged in the first row are selected. Accordingly, light signals based on the signal charges of the charge holding units FD1, FD2, FD5 and FD6 in the shared pixel groups S11 and S12 are output to the vertical signal line VTL. The output light signal is sampled by the column processing unit 25.

Then, FD reset pulses φRES_FD1(S11, S12), φRES_FD2 (S11, S12), qφRES_FD5(S11, S12), and φRES_FD6(S11, S12) are applied to the gate terminals of the respective FD reset transistors Mr_FD1, Mr_FD2, Mr_FD5, and Mr_FD6 of the first row of the shared pixel groups S11 and S12 to turn the FD reset transistors Mr_FD1, Mr_FD2, Mr_FD5, Mr_FD6 on. In this case, the charge holding units FD1, FD2, FD5 and FD6 in the shared pixel groups S11 and S12 are reset. Since the selection transistors Mse1, Mse2, Mse5, and Mse6 of the first row are turned on, reset signals based on the signal charges of the charge holding units FD1, FD2, FD5 and FD6 at the time of reset are output to the vertical signal line VTL. The reset signal is sampled by the column processing unit 25.

Also, processes such as noise removal, signal amplification, and AD conversion are performed using a difference between the two signal levels sampled by the column processing unit 25. The processed signal is output from the output terminal OUT via the horizontal scanning circuit 27. After the above operation is performed on the first row, the same operation is also performed on the fifth row. If reading is completed for the first row and the fifth row, the read operation period ends.

In the above operation, the signal charges generated by the photoelectric conversion units 29a in the output target pixel 300 (including the pixels 29 in two rows and two columns) are transferred to the memory units 29b in the output target pixels 301 (including the pixels 29 in one row and four columns). Then, signals based on the signal charges are read. Thus, in the present embodiment, the photoelectric conversion units 29a in the output target pixels (in the above description, an array of two rows and two columns) and the memory units 29b in the output target pixels (in the above description, an array of one row and four columns; the number of rows is smaller than the number of rows in the array of photoelectric conversion units 29a) in the same shared pixel group are associated with each other. Signal charges generated by the photoelectric conversion elements of the photoelectric conversion units 29a are transferred to the charge holding units of the memory units 29b associated with the respective photoelectric conversion units 29a.

Since the number of rows in the array of the memory units 29b holding signals to be read (in the above description, one row and four columns) is smaller than the number of rows in the array of the photoelectric conversion units 29a generating the signals to be read (in the above description, two rows and two columns), the number of rows from which signals are to be read is reduced. Accordingly, a time required for column processing for decimated image generation is reduced. Accordingly, the pixel signals constituting the decimated image can be read at higher speed. Further, the driving signal lines for driving the pixels 29 may be one system per row. Further, the vertical signal lines may be one system per column. Accordingly, the pixel signals can be read at a high speed with a simple configuration.

In order to perform the above operation, the control unit 28 selects the output target pixel. The control unit 28 associates the photoelectric conversion unit 29a with the memory unit 29b in the selected output target pixel. The control unit 28 transfers the signal charges of the associated photoelectric conversion unit 29a to the memory unit 29b. The control unit 28 controls the vertical scanning circuit 26 in order to control operation in which the signal based on the signal charges is read from the memory unit 29b. The vertical scanning circuit 26 generates a driving control pulse under control of the control unit 28. The vertical scanning circuit 26 outputs the driving control pulse to the photoelectric conversion unit 29a and the memory unit 29b.

Further, in the present embodiment, as illustrated in FIGS. 4 and 5, reading is performed in a decimation pattern. However, a combination of the photoelectric conversion units 29a and the memory units 29b related to reading of pixel signals is not limited thereto. In the combination of the photoelectric conversion units 29a and the memory units 29b, the number of rows of the memory units 29b holding signals to be read may be smaller than the number of rows of the photoelectric conversion units 29a generating the signals to be read.

As described above, according to the present embodiment, the plurality of photoelectric conversion elements and the plurality of charge holding units (signal accumulation circuits) are associated with each other in the same group (the output target pixel). The plurality of photoelectric conversion elements are targets from which signals are read. The plurality of charge holding units constitute an array having a number of rows smaller than the number of rows in the array of a plurality of photoelectric conversion elements in the same group. According to the present embodiment, as the signals generated by the plurality of photoelectric conversion elements are transmitted to the charge holding units associated with the respective photoelectric conversion elements, the pixel signals can be read at a higher speed.

(Second Embodiment)

Next, a second embodiment of the present invention will be described. A configuration of an imaging apparatus according to the present embodiment is the same as that of the imaging apparatus according to the first embodiment. For the method of driving the solid-state imaging device 2, the driving method in the second embodiment differs from the driving method described in the first embodiment in only the driving method in the transfer operation period, but is the same in the other periods.

Figure 11:
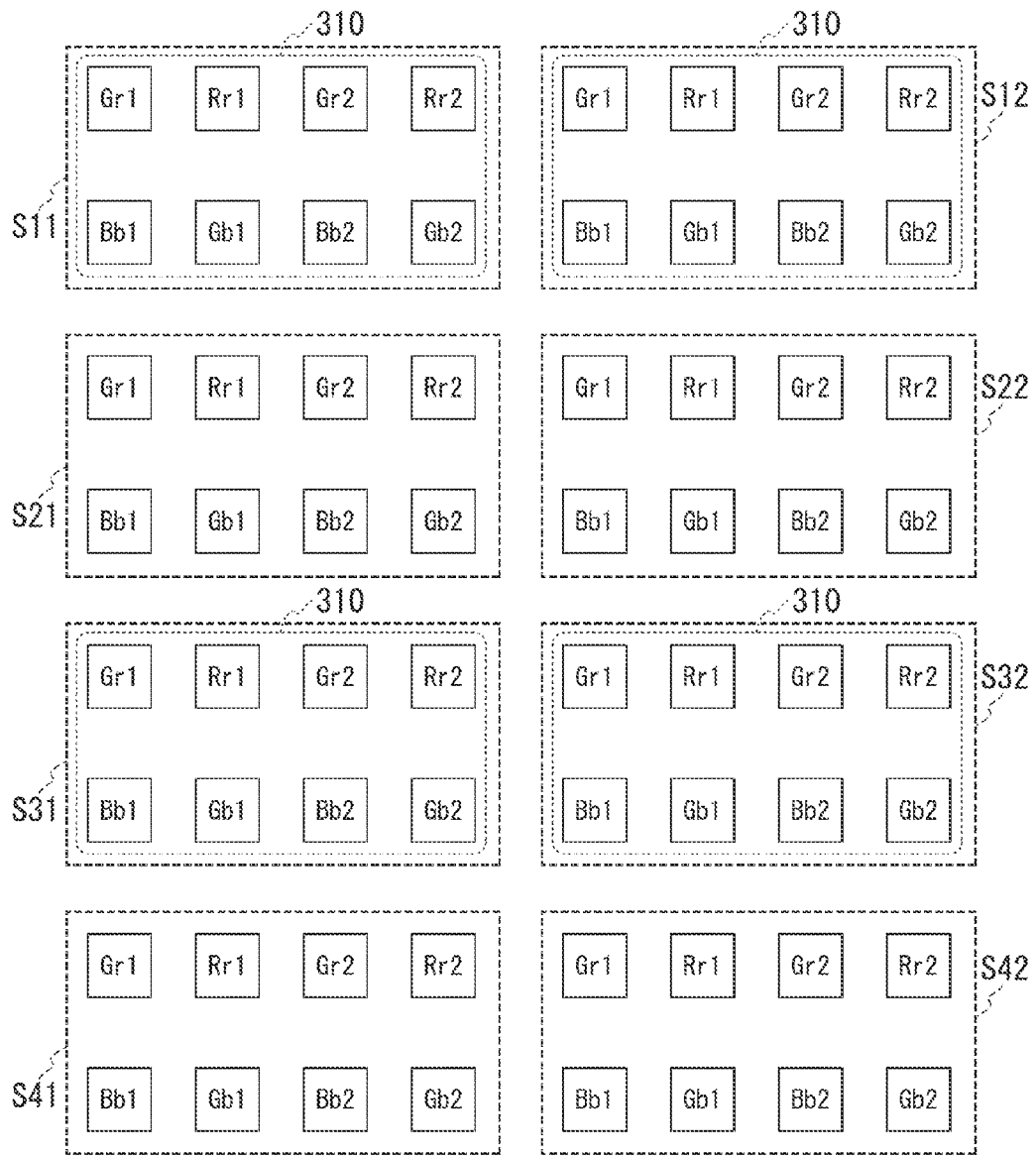
FIG. 11 is a diagram illustrating an array of photoelectric conversion units of a pixel unit included in a solid-state imaging device according to a second embodiment of the present invention.
Figure 12:
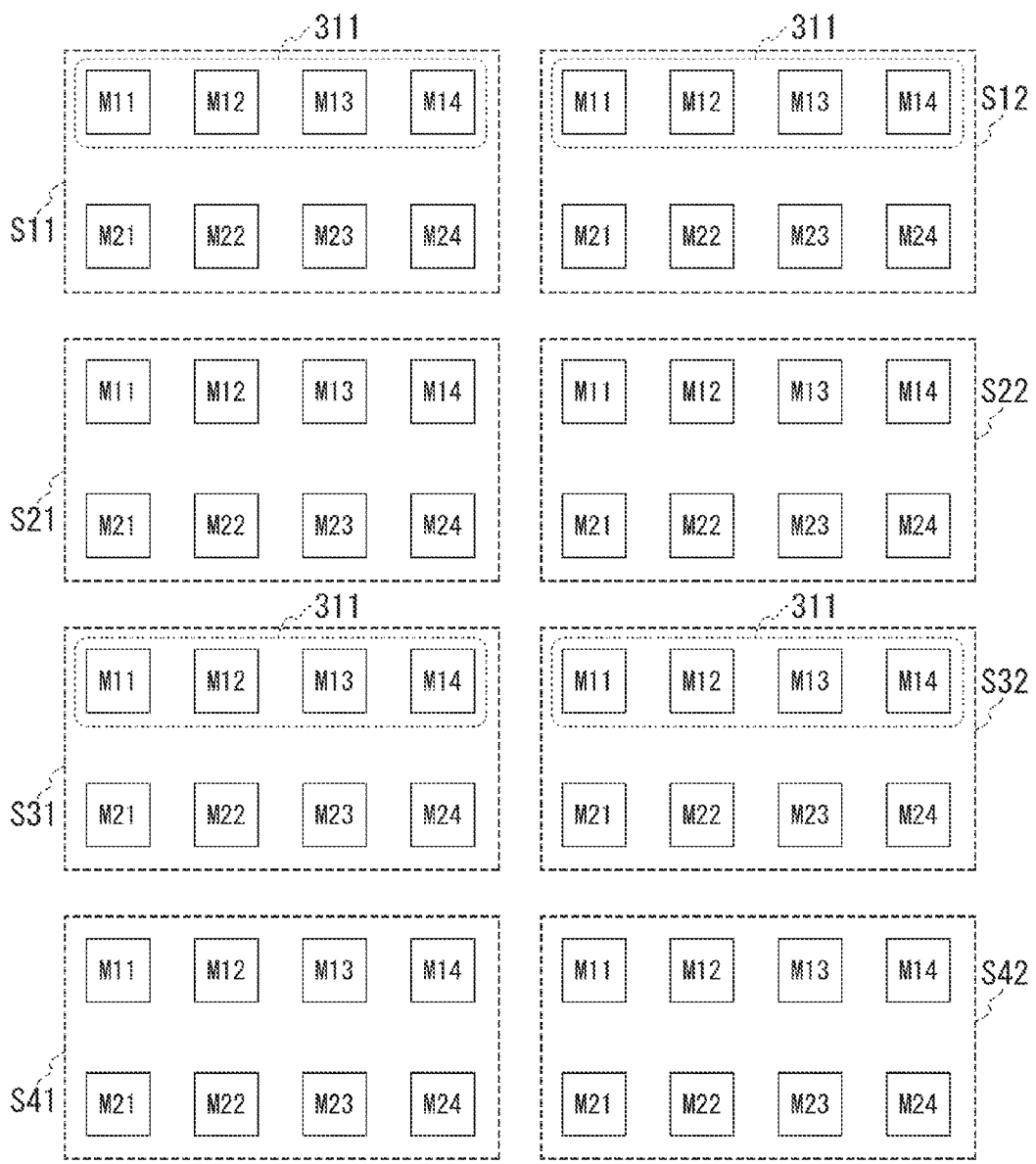
FIG. 12 is a diagram illustrating an array of memory units of the pixel unit included in the solid-state imaging device according to the second embodiment of the present invention.

FIG. 11 schematically illustrates an array of photoelectric conversion units 29a. FIG. 12 schematically illustrates an array of memory units 29b. FIG. 11 illustrates the array of the photoelectric conversion units 29a viewed from one direction (e.g., a light incidence direction) in a plane. FIG. 12 illustrates the array of the memory units 29b viewed from one direction (e.g., a light incidence direction) in a plane. That is, FIGS. 11 and 12 illustrate the units when viewed from the same direction. Shared pixel groups S11, S12, S21, S22, S31, S32, S41, and S42 are provided in respective corresponding positions of the array of photoelectric conversion units 29a and the array of memory units 29b.

As illustrated in FIG. 11, the shared pixel groups S11, S12, S21, S22, S31, S32, S41, and S42 include photoelectric conversion units Rr1, Rr2, Bb1, Bb2, Gr1, Gr2, Gb1 and Gb2 as the photoelectric conversion units 29a. The photoelectric conversion units Rr1, Rr2, Bb1, Bb2, Gr1, Gr2, Gb 1 and Gb2 are arranged according to a so-called Bayer array format.

As illustrated in FIG. 12, shared pixel groups S11, S12, S21, S22, S31, S32, S41, and S42 include memory units M11, M12, M13, M14, M21, M22, M23 and M24 as the memory units 29b. The photoelectric conversion units 29a photoelectric conversion units Rr1, Rr2, Bb1, Bb2, Gr1, Gr2, Gb1 and Gb2) included in the same shared pixel group and the memory units 29b (memory units M11, M12, M13, M14, M21, M22, M23 and M24) have a corresponding relationship.

Further, FIGS. 11 and 12 illustrate output target pixels. The output target pixel 310 of FIG. 11 and the output target pixel 311 of FIG. 12 are output target pixels of the present embodiment. The output target pixel 310 includes eight pixels 29. The output target pixel 311 includes four pixels 29.

Thus, the number of photoelectric conversion units 29a included in the output target pixel 310 is twice the number of the memory units 29b included in the output target pixel 311. The output target pixel 310 includes pixels 29 in two rows and four columns. The output target pixel 310 includes photoelectric conversion units Rr1, Bb1, Gr1, Gb1, Rr2, Bb2, Gr2, and Gb2. The output target pixel 311 includes pixels 29 in one row and four columns. The output target pixel 311 includes memory units M11, M12, M13, and M14.

The output target pixel 310 and the output target pixel 311 included in the same shared pixel group have a correspondence relationship. That is, signal charges generated by the photoelectric conversion elements of the photoelectric conversion units Rr1, Bb1, Gr1, Gb1, Rr2, Bb2, Gr2 and Gb2 of the output target pixel 310 are output to the memory units M11, M12, M13, and M14 of the output target pixel 311 included in the same shared pixel group as the shared pixel group including the output target pixel 310.

In the present embodiment, signal charges generated (produced) by the two photoelectric conversion units 29a are added by and held in one memory unit 29b. More specifically, signal charges generated (produced) by the photoelectric conversion units Gr1 and Gr2 are added by and held in the memory unit M11. Then, signal charges generated (produced) by the photoelectric conversion units Rr1 and Rr2 are added by and held in the memory unit M12. Next, signal charges generated (produced) by the photoelectric conversion units Bb1 and Bb2 are added by and held in the memory unit M13. Also, signal charges generated (produced) by the photoelectric conversion units Gb1 and Gb2 are added by and held in the memory unit M14.

Figure 13:
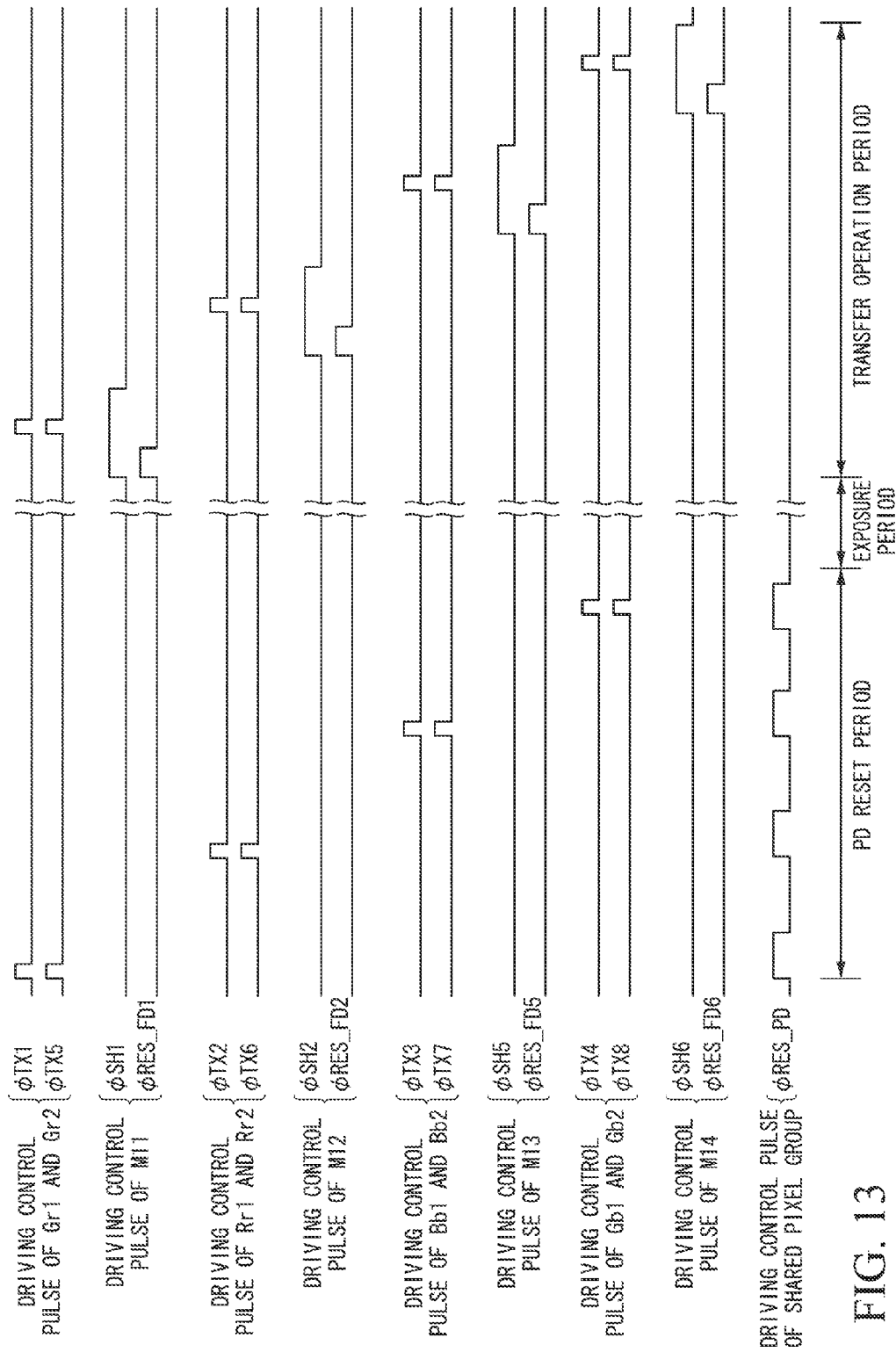
FIG. 13 is a timing chart illustrating operation of the solid-state imaging device according to the second embodiment of the present invention.

Next, a method of driving a solid-state imaging device 2 in the present embodiment will be described. FIG. 13 illustrates respective driving control pulses for the photoelectric conversion units Gr1 and Gr2, the memory unit M11, the photoelectric conversion units Rr1 and Rr2, the memory unit M12, the photoelectric conversion units Bb1 and Bb2, the memory unit M13, the photoelectric conversion units Gb1 and Gb2, and the memory unit M14 in the shared pixel group, and a driving control pulse common to the shared pixel groups in order from the top.

The PD reset period is a period in which reset is performed by discharging signal charges accumulated in the photoelectric conversion elements PD_Gr1, PD_Rr1, PD_Bb1, PD_Gb1, PD_Gr2, PD_Rr2, PD_Bb2, and PD_Gb2 at the start of exposure. Operations from start of reset to end of a signal charge transfer operation are performed at common timings in each shared pixel group. That is, operations illustrated in FIG. 13 are performed in the shared pixel group S11 and simultaneously performed in other shared pixel groups S12, S21, S22, S31, S32, S41, and S42.

The operation in the PD reset period of FIG. 13 is the same as the operation in the reset period of FIG. 10 except that the resets of the photoelectric conversion elements are simultaneously performed two at a time. More specifically, after the photoelectric conversion elements PD_Gr1 and PD_Gr2 of the photoelectric conversion units Gr1 and Gr2 are reset, the photoelectric conversion elements PD_Rr1 and PD_Rr2 of the photoelectric conversion units Rr1 and Rr2, the photoelectric conversion elements PD_Bb1 and PD_Bb2 of the photoelectric conversion units Bb1 and Bb2, and the photoelectric conversion elements PD_Gb1 and PD_Gb2 of the photoelectric conversion units Gb1 and Gb2 are sequentially reset. When the above operation is completed, the PD reset period ends. When a predetermined time has elapsed after the exposure starts, operation in the transfer operation period is performed.

The transfer operation period is a period in which the signal charges accumulated in the photoelectric conversion elements PD_Gr1, PD_Gr2, PD_Rr1, PD_Rr2, PD_Bb1, PD_Bb2, PD_Gb1, and PD_Gb2 after the exposure starts are transferred to the charge holding units FD1, FD2, FD5 and FD6. In this case, the signal charges accumulated in the two photoelectric conversion elements corresponding to the same color are added and accumulated in one charge holding unit associated with the two photoelectric conversion elements.

First, the sample and hold pulse φSH1 is applied to the gate terminal of the sample-and-hold transistor Msh1 to turn the sample-and-hold transistor Msh1 on. In this case, the charge holding unit FD1 is selected as a transfer destination for signal charges. Simultaneously, the FD reset pulse φRES_FD1 is applied to the gate terminal of the FD reset transistor Mr_FD1 to turn the FD reset transistor Mr_FD1 on. In this case, the charge holding unit FD1 is reset.

Then, the transfer pulses φTX1 and φTX5 are applied to the gate terminals of the transfer transistors Mtx1 and Mtx5 to turn the transfer transistors Mtx1 and Mtx5 on. In this case, the signal charges in the photoelectric conversion elements PD_Gr1 and PD_Gr2 in the photoelectric conversion units Gr1 and Gr2 are transferred to and held in the charge holding unit FD1 in the memory unit M11. Similarly, the transfer pulses φTX2 and φTX6, the FD reset pulse φRES_FD2, and the sample and hold pulse φSH2 are sequentially applied to transfer the signal charges in the photoelectric conversion elements PD_Rr1 and PD_Rr2 to the charge holding unit FD2 and hold the signal charges in the charge holding unit FD2. Subsequently, the transfer pulses φTX3 and φTX7, the FD reset pulse φRES_FD5, and the sample and hold pulse φSH5 are sequentially applied to transfer signal charges in the photoelectric conversion elements PD_Bb1 and PD_Bb2 to the charge holding unit FD5 and hold the signal charges in the charge holding unit FD5. Subsequently, the transfer pulses φTX4 and φTX8, the FD reset pulse φRES_FD6, and the sample and hold pulse φSH6 are sequentially applied to transfer signal charges in the photoelectric conversion elements PD_Gb1 and PD_Gb2 to the charge holding unit FD6 and hold the signal charges in the charge holding unit FD6.

When the above operation is completed for the photoelectric conversion units Gr1, Gr2, Rr1, Rr2, Bb1, Bb2, Gb1, and Gb2 in the shared pixel group, the transfer operation period ends and operation in the read operation period is performed. Since the operation in the read operation period is the same as that of the first embodiment, a description thereof is omitted here.

As described above, as the signals of the pixels having a color filter with the same color in each shared pixel group are added in the transfer operation period, the effects of the first embodiment can be obtained. In addition, it is possible to increase sensitivity, suppress moiré, and suppress random noise. Accordingly, it is possible to realize simultaneity of exposure, as in a global shutter at the time of generation of a decimated image, and to read a high-quality pixel signal.

(Third Embodiment)

Next, a third embodiment of the present invention will be described. A method of driving a solid-state imaging device according to the present embodiment is the same as the method of driving a solid-state imaging device according to the first embodiment or the second embodiment.

A configuration of the solid-state imaging device 2 differs from the configurations illustrated in the first embodiment and the second embodiment.

Figure 14:
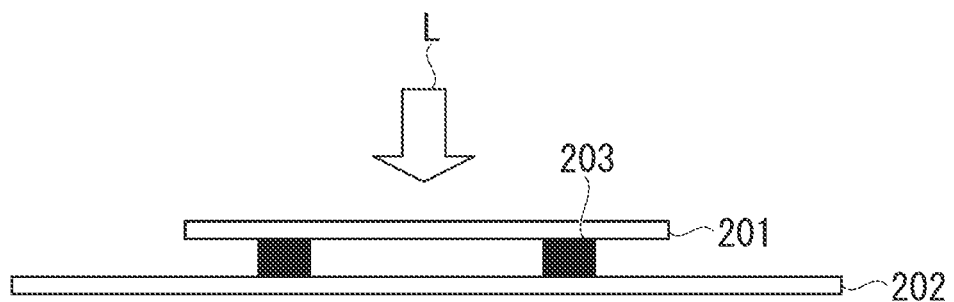
FIG. 14 is a cross-sectional view of a solid-state imaging device according to a third embodiment of the present invention.

FIG. 14 illustrates a cross-sectional structure of the solid-state imaging device 2 in the present embodiment. The solid-state imaging device 2 has a structure in which two substrates (a first substrate 201 and a second substrate 202) in which circuit elements (e.g., the photoelectric conversion elements, the transistors, and the capacitors) in the pixels 29 are arranged overlap. The circuit elements in the pixels 29 are distributed to and arranged in the first substrate 201 and the second substrate 202. The first substrate 201 and the second substrate 202 are electrically connected so that an electrical signal can be delivered between the two substrate at the time of driving the pixels 29.

Between two main surfaces (surfaces having a relatively greater surface area than side surfaces) of the first substrate 201, the photoelectric conversion element is formed in the main surface irradiated with light L. The light irradiated on the first substrate 201 is incident on the photoelectric conversion element. A connection part 203 for connection with the second substrate 202 is arranged in the main surface opposite to the main surface irradiated with the light L among the two main surfaces of the first substrate 201.

Each of the column processing unit 25, the vertical scanning circuit 26, and the horizontal scanning circuit 27 other than the pixels 29 may be arranged in any one of the first substrate 201 and the second substrate 202. Further, circuit elements in each of the column processing unit 25, the vertical scanning circuit 26, and the horizontal scanning circuit 27 may be distributed to and arranged in the first substrate 201 and the second substrate 202.

Figure 15:
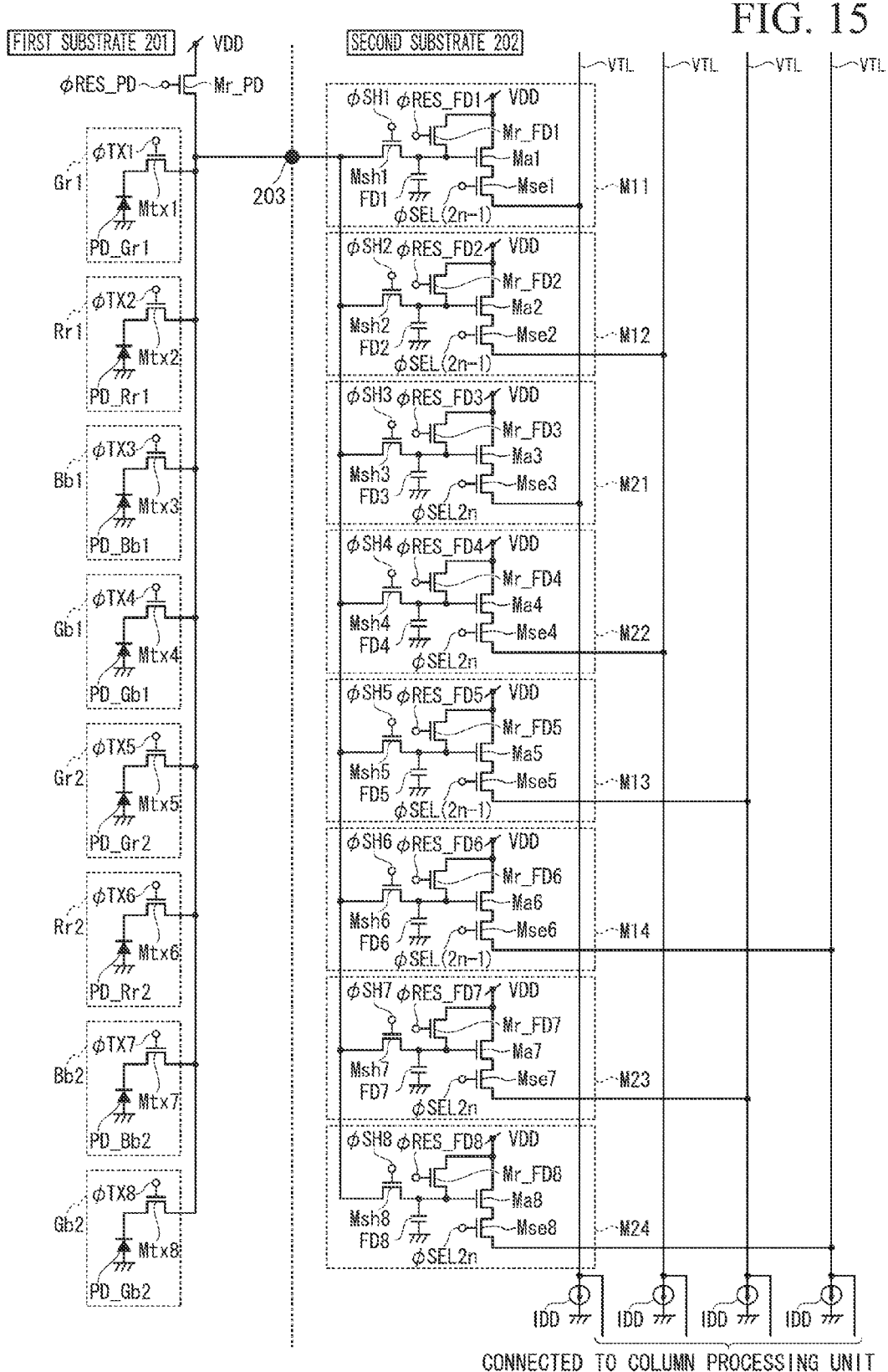
FIG. 15 is a circuit diagram illustrating a configuration of a shared pixel group included in the solid-state imaging device according to the third embodiment of the present invention.

FIG. 15 illustrates a circuit configuration of one shared pixel group. In FIG. 15, a circuit configuration of the shared pixel group in the pixel unit 24 in the first substrate 201 and a circuit configuration of the shared pixel group in the pixel unit 24 in the second substrate 202 are illustrated. The two circuit configurations are electrically connected by the connection part 203.

The shared pixel group on the side of the first substrate 201 includes photoelectric conversion units Gr1, Rr1, Bb1, Gb1, Gr2, Rr2, Bb2 and Gb2 in the pixel unit 24, and a PD reset transistor Mr_PD. The PD reset transistor Mr_PD is shared by the eight photoelectric conversion units Gr1, Rr1, Bb1, Gb1, Gr2, Rr2, Bb2 and Gb2. Since details of the photoelectric conversion units Gr1, Rr1, Bb1, Gb1, Gr2, Rr2, Bb2 and Gb2 and the PD reset transistor Mr_PD are the same as those of the first embodiment, a description thereof is omitted here.

The shared pixel group on the side of the second substrate 202 includes memory units M11, M12, M21, M22, M13, M14, M23, and M24 in the pixel unit 24. Since details of the memory units M11, M12, M21, M22, M13, M14, M23, and M24 are the same as those of the first embodiment, a description thereof is omitted here.

Source terminals of the transfer transistors Mtx1 to Mtx8 arranged in the first substrate 201, a source terminal of the PD reset transistor Mr_PD, and drain terminals of sample-and-hold transistors Msh1 to Msh8 arranged in the second substrate 202 are connected via the connection part 203. Signal charges generated (produced) by the photoelectric conversion units on the side of the first substrate 201 are output to the memory units on the side of the second substrate 202 via the connection part 203.

As described above, as the photoelectric conversion elements are formed in the main surface irradiated with light of the first substrate 201 and the memory units are formed in the second substrate 202, it is possible to shield the memory units while securing a light receiving area of the photoelectric conversion elements. Accordingly, it is possible to realize simultaneity of exposure, as in a global shutter, and read a high-quality pixel signal at the time of generation of a decimated image.

Next, variants of the first to third embodiments described above will be described.

(First Variant)

Figure 16:
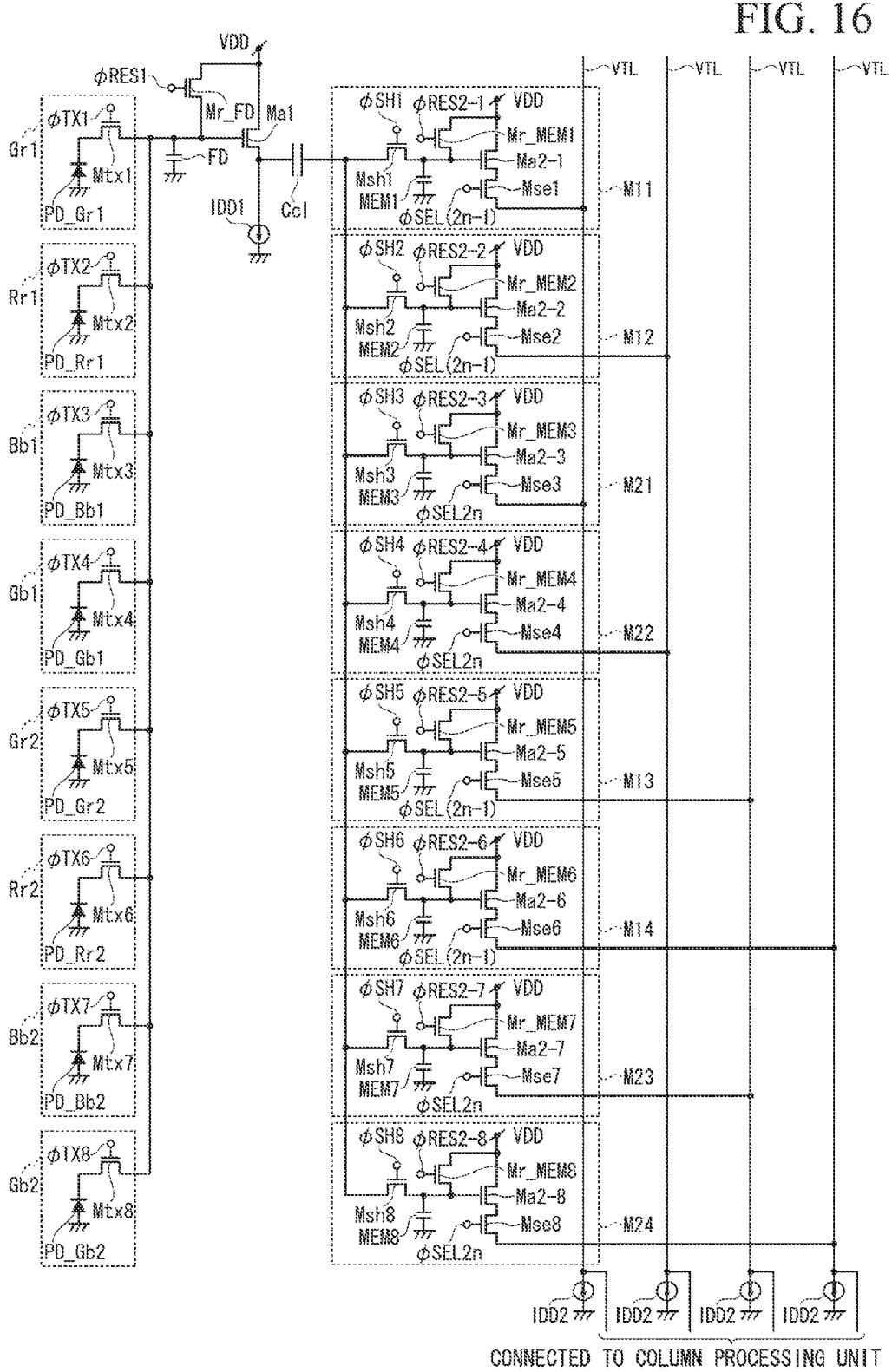
FIG. 16 is a circuit diagram illustrating another configuration of a shared pixel group included in the solid-state imaging device according to the first and second embodiments of the present invention.

First, a first variant will be described. The present variant is a variant of the first and second embodiments. FIG. 16 illustrates another example of a circuit configuration of one shared pixel group.

A shared pixel group includes photoelectric conversion units Gr1, Rr1, Bb1, Gb1, Gr2, Rr2, Bb2 and Gb2, an FD reset transistor Mr_FD, a charge holding unit FD, an amplification transistor Ma1, a current source IDD1, a clamp capacitor Ccl, and memory units M111, M12, M21, M22, M13, M14, M23, and M24 in a pixel unit 24. The FD reset transistor Mr_FD, the charge holding unit FD, the amplification transistor Ma1, and the current source IDD1 are shared by eight photoelectric conversion units Gr1, Rr1, Bb1, Gb1, Gr2, Rr2, Bb2 and Gb2. The clamp capacitor Ccl is shared by the eight memory units M11, M12, M13, M14, M21, M22, M23 and M24.

Since details of the photoelectric conversion units Gr1, Rr1, Bb1, Gb1, Gr2, Rr2, Bb2 and Gb2 are the same as those of the first embodiment, a description thereof is omitted here. A drain terminal of the FD reset transistor Mr_FD is connected to a supply voltage VDD. A source terminal of the FD reset transistor Mr_FD is connected to source terminals of the transfer transistors Mtx1 to Mtx8. A gate terminal of the FD reset transistor Mr_FD is connected to the vertical scanning circuit 26. A reset pulse φRES1 is supplied to the gate terminal of the FD reset transistor Mr_FD.

One terminal of the charge holding unit FD is connected to the source terminals of the transfer transistors Mtx1 to Mtx8. The other terminal of the charge holding unit FD is grounded. A drain terminal of the amplification transistor Ma1 is connected to the supply voltage VDD. A gate terminal that is an input part of the amplification transistor Ma1 is connected to the source terminals of the transfer transistors Mtx1 to Mtx8. One terminal of a current source IDD1 is connected to the source terminal of the amplification transistor Ma1. The other terminal of the current source IDD1 is grounded. For example, the current source IDD1 may include a transistor having a drain terminal connected to the source terminal of the amplification transistor Ma1, a grounded source terminal, and a gate terminal connected to the vertical scanning circuit 26.

The memory units M11, M12, M21, M22, M13, M14, M23, and M24 are connected with the photoelectric conversion units Gr1, Rr1, Bb1, Gb1, Gr2, Rr2, Bb2 and Gb2 via the clamp capacitor Ccl. The memory units M11, M12, M21, M22, M13, M14, M23, and M24 include sample-and-hold transistors Msh1 to Msh8, memory reset transistors Mr_MEM1 to Mr_MEM8, analog memories MEM1 to MEM8, amplification transistors Ma2-1 to Ma2-8, and selection transistors Mse1 to Mse8, respectively. A configuration of the memory units M11, M12, M21, M22, M13, M14, M23, and M24 of the present variant partially differs from the configuration of the memory units M11, M12, M21, M22, M13, M14, M23, and M24 illustrated in FIG. 6.

One terminal of the clamp capacitor Ccl is connected to the source terminal of the amplification transistor Ma1. Drain terminals of the sample-and-hold transistors Msh1 to Msh8 are connected to the other terminal of the clamp capacitor Ccl. Gate terminals of the sample-and-hold transistors Msh1 to Msh8 are connected to the vertical scanning circuit 26. Sample and hold pulses φSH1 to φSH8 are supplied to the gate terminals of the sample-and-hold transistors Msh1 to Msh8.

Drain terminals of the memory reset transistors Mr_MEM1 to Mr_MEM8 are connected to the supply voltage VDD. Source terminals of the memory reset transistors Mr_MEM1 to Mr_MEM8 are connected to the source terminals of the sample-and-hold transistors Msh1 to Msh8. Gate terminals of the memory reset transistors Mr_MEM1 to Mr_MEM8 are connected to the vertical scanning circuit 26. The memory reset pulses φRES2-1 to φRES2-8 are supplied to the gate terminals of the memory reset transistors Mr_MEM1 to Mr_MEM8.

One terminals of the analog memories MEM1 to MEM8 are connected to the source terminals of the sample-and-hold transistors Msh1 to Msh8, respectively. The other terminals of the analog memories MEM1 to MEM8 are grounded. Drain terminals of the amplification transistors Ma2-1 to Ma2-8 are connected to the supply voltage VDD. Gate terminals constituting input parts of the amplification transistors Ma2-1 to Ma2-8 are connected to the source terminals of the sample-and-hold transistors Msh1 to Msh8.

Drain terminals of the selection transistors Mse1 to Mse8 are connected to the source terminals of the amplification transistors Ma2-1 to Ma2-8. Source terminals of the selection transistors Mse1 to Mse8 are connected to the vertical signal line VTL. Gate terminals of the selection transistors Mse1, Mse2, Mse5, and Mse6 of the odd rows are connected to the vertical scanning circuit 26. A selection pulse φSEL(2n−1) is supplied to the gate terminals of the selection transistors Mse1, Mse2, Mse5, and Mse6. Gate terminals of the selection transistors Mse3, Mse4, Mse7, and Mse8 of even rows are connected to the vertical scanning circuit 26. A selection pulse φSEL2n is supplied to the gate terminals of the selection transistors Mse3, Mse4, Mse7, and Mse8. (2n−1) and 2n of the selection pulses φSEL(2n−1) and φSEL2n correspond to the number of rows. For each transistor described above, the polarity may be reversed. Further, the source terminals and the drain terminals may be the reverse of that indicated above.

The charge holding unit FD is a floating diffusion capacitor. The charge holding unit FD temporarily holds signal charges transferred from the photoelectric conversion elements PD_Gr1, PD_Rr1, PD_Bb1, PD_Gb1, PD_Gr2, PD_Rr2, PD_Bb2, and PD_Gb2.

The FD reset transistor Mr_FD resets the charge holding unit FD. On/off of the FD reset transistor Mr_FD is controlled by the reset pulse φRES1 from the vertical scanning circuit 26. The photoelectric conversion elements PD_Gr1, PD_Rr1, PD_Bb1, PD_Gb1, PD_Gr2 PD_Gr2, PD_Bb2, and PD_Gb2 can be reset by simultaneously turning the FD reset transistor Mr_FD and the transfer transistors Mtx1 to Mtx8 on.

The amplification transistor Ma1 outputs, from the source terminal, the amplification signal input to the gate terminal. The amplification signal is a signal amplified based on the signal charges held in the charge holding unit FD. The current source IDD1 functions as a load of the amplification transistor Ma1. The current source IDD1 supplies current to the amplification transistor Ma1 to drive the amplification transistor Ma1. The amplification transistor Ma1 and the current source IDD1 constitute a source follower circuit.

The clamp capacitor Ccl is a capacitor that clamps (fixes) a voltage level of the amplification signal output from the amplification transistor Ma1. The sample-and-hold transistors Msh1 to Msh8 sample and hold a voltage level of the other terminal of the clamp capacitor Ccl. The sample-and-hold transistors Msh1 to Msh8 are held in the analog memories MEM1 to MEM8. On/off of the sample-and-hold transistors Msh1 to Msh8 is controlled by the sample and hold pulses φSH1 to SH8 from the vertical scanning circuit 26.

The memory reset transistors Mr_MEM1 to Mr_MEM8 reset the analog memories MEM1 to MEM8. On/off of the memory reset transistors Mr_MEM1 to Mr_MEM8 is controlled by the memory reset pulses φRES2-1 to φRES2-8 from the vertical scanning circuit 26. The analog memories MEM1 to MEM8 hold the analog signals that are sampled and held by the sample-and-hold transistors Msh1 to Msh8.

Capacitances of the analog memories MEM1 to MEM8 are set to be greater than that of the charge holding unit FD. It is desirable for MIM (Metal Insulator Metal) capacitance or MOS (Metal Oxide Semiconductor) capacitance having small leak current (dark current) per unit area to be used in the analog memories MEM1 to MEM8. Accordingly, immunity to noise can be improved and a high quality signal can be obtained.

From the source terminals, the amplification transistors Ma2-1 to Ma2-8 output the amplification signals input to the gate terminals. The amplification signals are signals amplified based on the signal charges held in the analog memories MEM1 to MEM8. The amplification transistors Ma2-1 to Ma2-8 and the current source IDD2 connected to the vertical signal line VTL constitute a source follower circuit. The selection transistors Mse1 to Mse4 select the memory units M11, M12, M21, M22, M13, M14, M23, and M24. The selection transistors Mse1 to Mse4 send outputs of the amplification transistors Ma1 to Ma4 to the vertical signal line VTL. On/off of the selection transistors Mse1 to Mse4 is controlled by the selection pulses φSEL(2n−1) and φSEL2n from the vertical scanning circuit 26.

After the reset of the photoelectric conversion elements PD_Gr1, PD_Rr1, PD_Bb1, PD_Gb1, PD_Gr2, PD_Rr2, PD_Bb2, and PD_Gb2 and the reset of the charge holding unit FD end, the signal charges accumulated in the photoelectric conversion elements PD_Gr1, PD_Rr1, PD_Bb1, PD_Gb1, PD_Gr2, PD_Rr2, PD_Bb2, and PD_Gb2 are transferred to the charge holding unit FD. Further, the signals based on the signal charges held in the charge holding unit FD are transferred to and held in the analog memories MEM1 to MEM8. The light signals based on the signal charges held in the analog memories MEM1 to MEM8 and on the reset signal when the analog memories MEM1 to MEM4 are reset are output to the vertical signal line VTL via the amplification transistors Ma2-1 to Ma2-8 and the selection transistors Mse1 to Mse8.

Hereinafter, a change in the potential of one terminal of the analog memory MEM1 when the signal charges accumulated in the photoelectric conversion element PD_Gr1 are transferred to the charge holding unit FD and a signal based on the signal charges are transferred to the analog memory MEM1 will be described. The same applies to a change in a potential of one terminal of the analog memories MEM2 to MEM8. After the reset of the charge holding unit FD ends, signal charges are transferred from the photoelectric conversion element PD_Gr1 to the charge holding unit FD to change the potential of one terminal of the charge holding unit FD. The potential of one terminal of the charge holding unit FD is assumed to be $\Delta Vfd$. Further, a gain of the amplification transistor Ma1 is assumed to be $\alpha 1$. In this case, as signal charges are transferred from the photoelectric conversion element PD_Gr1 to the charge holding unit FD, a potential of the source terminal of the amplification transistor Ma1 is changed. The potential $\Delta Vamp1$ of the source terminal of the amplification transistor Ma1 is assumed to be $\alpha 1 \times \Delta Vfd$.

A total gain of the analog memory MEM1 and the sample-and-hold transistor Msh1 is assumed to be $\alpha 2$. After the signal charges are transferred from the photoelectric conversion element PD_Gr to the charge holding unit FD, the potential of one terminal of the analog memory MEM1 due to sampling and holding of the sample-and-hold transistor Msh1 is changed. The potential $\Delta Vmem$ of one terminal of the analog memory MEM1 is assumed to be $\alpha 2 \times \Delta Vamp1$. That is, $\Delta Vmem$ is assumed to be $\alpha 1 \times \alpha 2 \times \Delta Vfd$. $\Delta Vfd$ denotes a change amount of the potential of one terminal of the charge holding unit FD due to the transfer of the signal charges. $\Delta Vfd$ does not include reset noise generated as the charge holding unit FD is reset. Accordingly, as the sample-and-hold transistor Msh1 performs sample and hold, it is possible to reduce the influence of noise generated by the photoelectric conversion unit.

The potential of one terminal of the analog memory MEM1 at a time point at which the reset of the analog memory MEM1 ends is the supply voltage VDD. Accordingly, after the signal charges are transferred from the photoelectric conversion element PD_Gr to the charge holding unit FD, the potential Vmem of one terminal of the analog memory MEM1 sampled and held by the sample-and-hold transistor Msh1 is represented by the following Equation (1). In Equation (1), ΔVmem<0 and ΔVfd<0.

$$Vmem = VD + \Delta Vmem \quad (1)$$
$$= VD + \alpha 1 \times \alpha 2 \times \Delta Vfd$$

Further, α2 is represented by the following Equation (2). In Equation (2), CL denotes a capacitance value of the clamp capacitor Ccl. CSH denotes a capacitance value of the analog memory MEM1. In order to reduce degradation of the gain, it is desirable for the capacitance value CL of the clamp capacitor Ccl to be greater than the capacitance value CSH of the analog memory MEM1.

$$\alpha 2 = \frac{CL}{CL + CSH} \quad (2)$$

The column processing unit 25 generates a difference signal having a difference between a light signal based on the potential Vmem shown in Equation (1) and the reset signal. The reset signal is a signal based on the potential of one terminal of the analog memory MEM1 when the analog memory is reset. The difference signal is a signal based on a difference between the potential Vmem shown in Equation (1) and the supply voltage VD. Further, the difference signal is a signal based on a difference ΔVfd between the potential of one terminal of the charge holding unit FD immediately after the signal charges accumulated in the photoelectric conversion element PD_Gr are transferred to the charge accumulation unit FD and the potential of the charge holding unit FD immediately after one terminal of the charge holding unit FD is reset. Accordingly, it is possible to obtain a signal component based on the signal charges accumulated in the photoelectric conversion element PD_Gr1 in which a noise component caused by reset of the analog memory MEM1 and a noise component caused by reset of the charge holding unit FD are suppressed.

It is possible to read a pixel signal constituting the decimated image at a high speed by driving the solid-state imaging device 2 having the shared pixel group illustrated in FIG. 16 using the driving method described in the first embodiment. It is also possible to read a high-quality pixel signal by driving the solid-state imaging device 2 having the shared pixel group illustrated in FIG. 16 using the driving method illustrated in the second embodiment.

(Second Variant)

Figure 17:
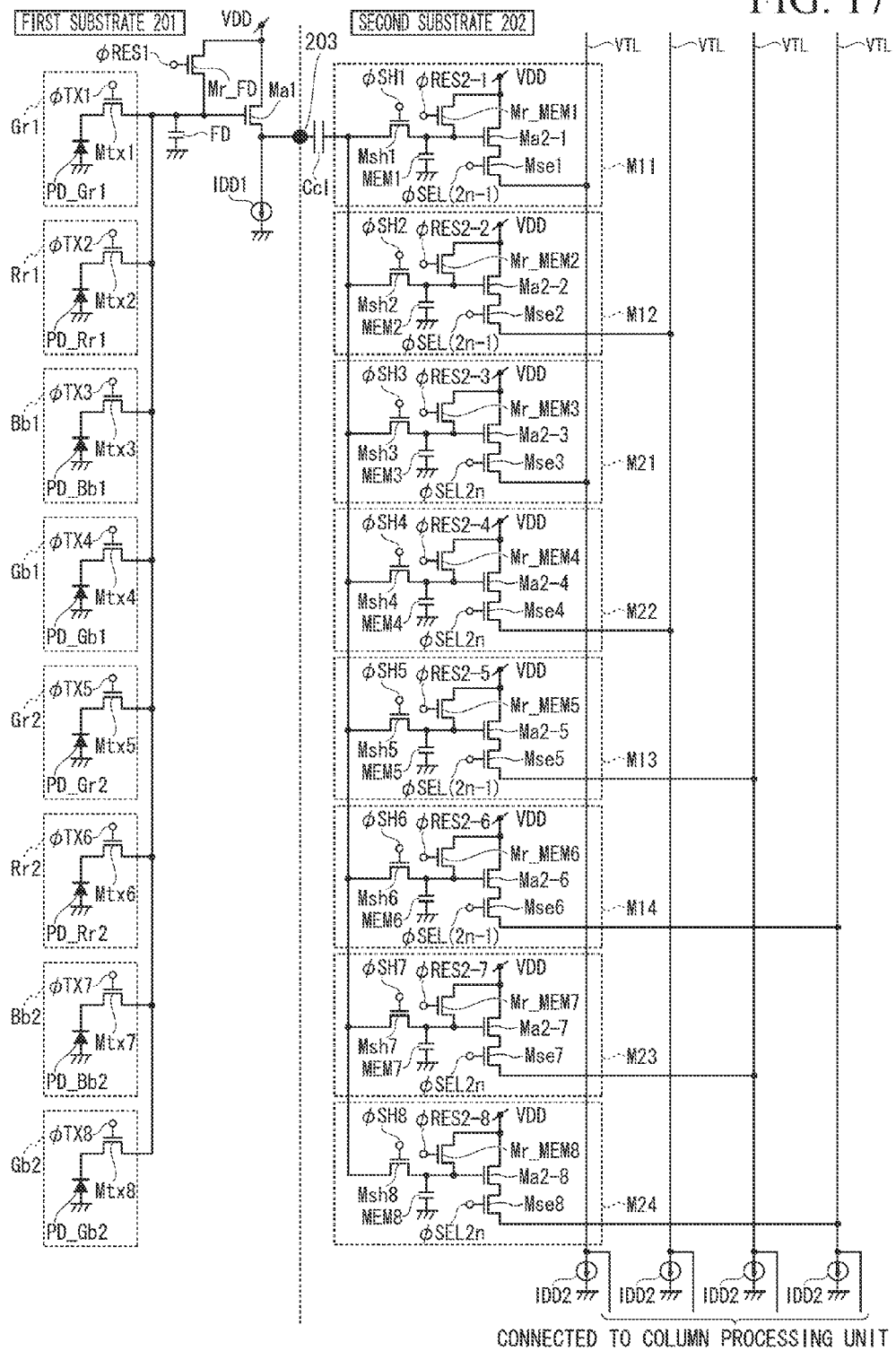
FIG. 17 is a circuit diagram illustrating another configuration of the shared pixel group included in the solid-state imaging device according to the third embodiment of the present invention.

Next, a second variant will be described. The present variant is a variant of the third embodiment. FIG. 17 is illustrates another example of a circuit configuration of one shared pixel group. In FIG. 17, a circuit configuration of a shared pixel group in the pixel unit 24 in the first substrate 201 and a circuit configuration of a shared pixel group in the pixel unit 24 in the second substrate 202 are illustrated. The circuit configurations are electrically connected by the connection part 203.

Since the circuit configuration of the shared pixel group illustrated in FIG. 17 is the same as the circuit configuration of the shared pixel group illustrated in FIG. 16, a description thereof is omitted here. In the present variant, one terminal of the clamp capacitor Ccl is connected to the source terminal of the amplification transistor Ma1 via the connection part 203. A signal based on signal charges generated (produced) by the photoelectric conversion unit on the side of the first substrate 201 is output to the memory unit on the side of the second substrate 202 via the connection part 203.

According to the configuration illustrated in FIG. 17, it is possible to shield the memory unit while securing a light receiving area of the photoelectric conversion element, as in the third embodiment. Accordingly, it is possible to realize simultaneity of exposure, as in a global shutter and read a high-quality pixel signal at the time of generation of a decimated image.

(Third Variant)

Next, a third variant will be described. The present variant is a variant of the first embodiment and the third embodiment.

Figure 18:
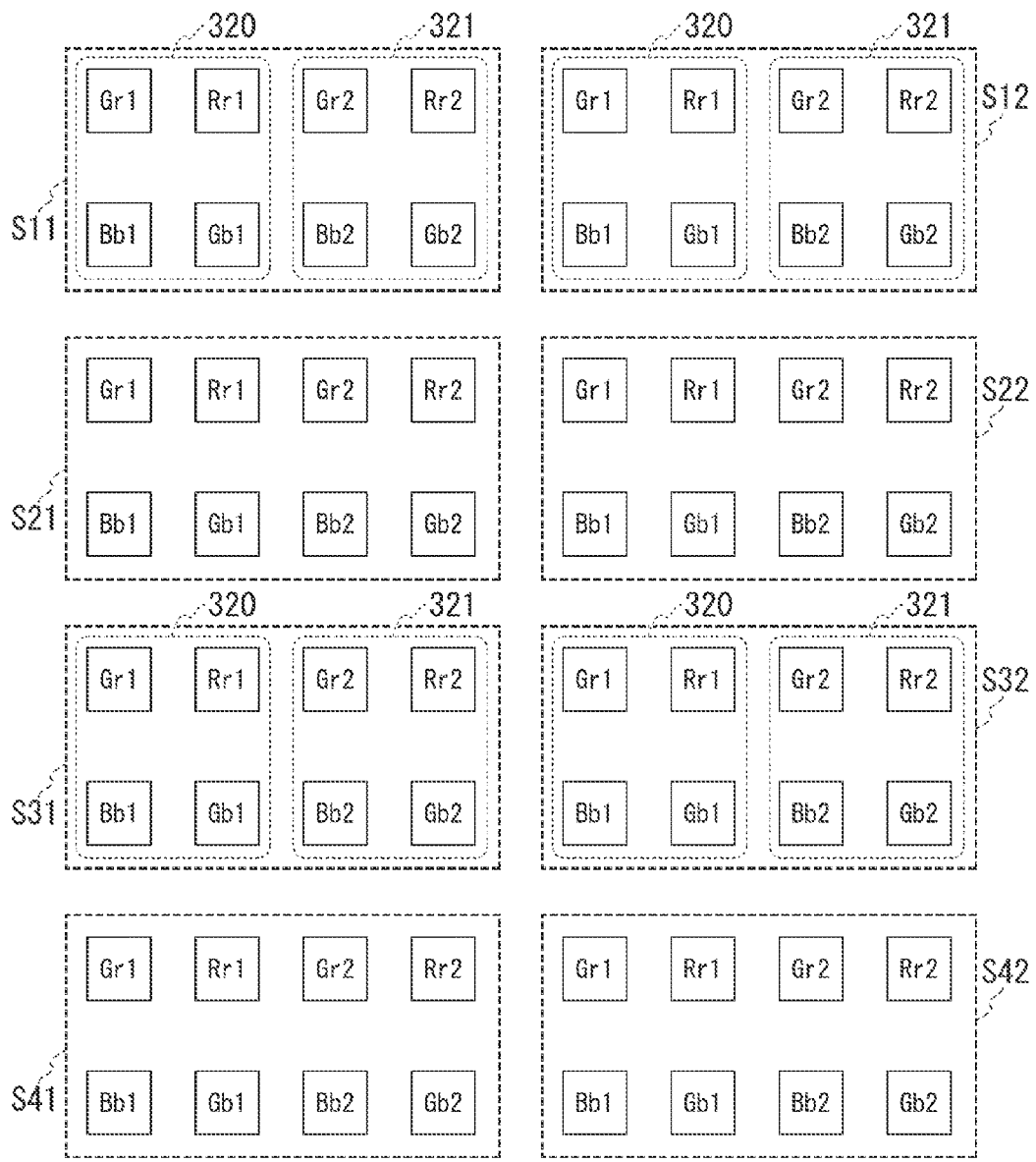
FIG. 18 is a diagram illustrating an array of photoelectric conversion units of the pixel unit included in the solid-state imaging device according to the first and third embodiments of the present invention.
Figure 19:
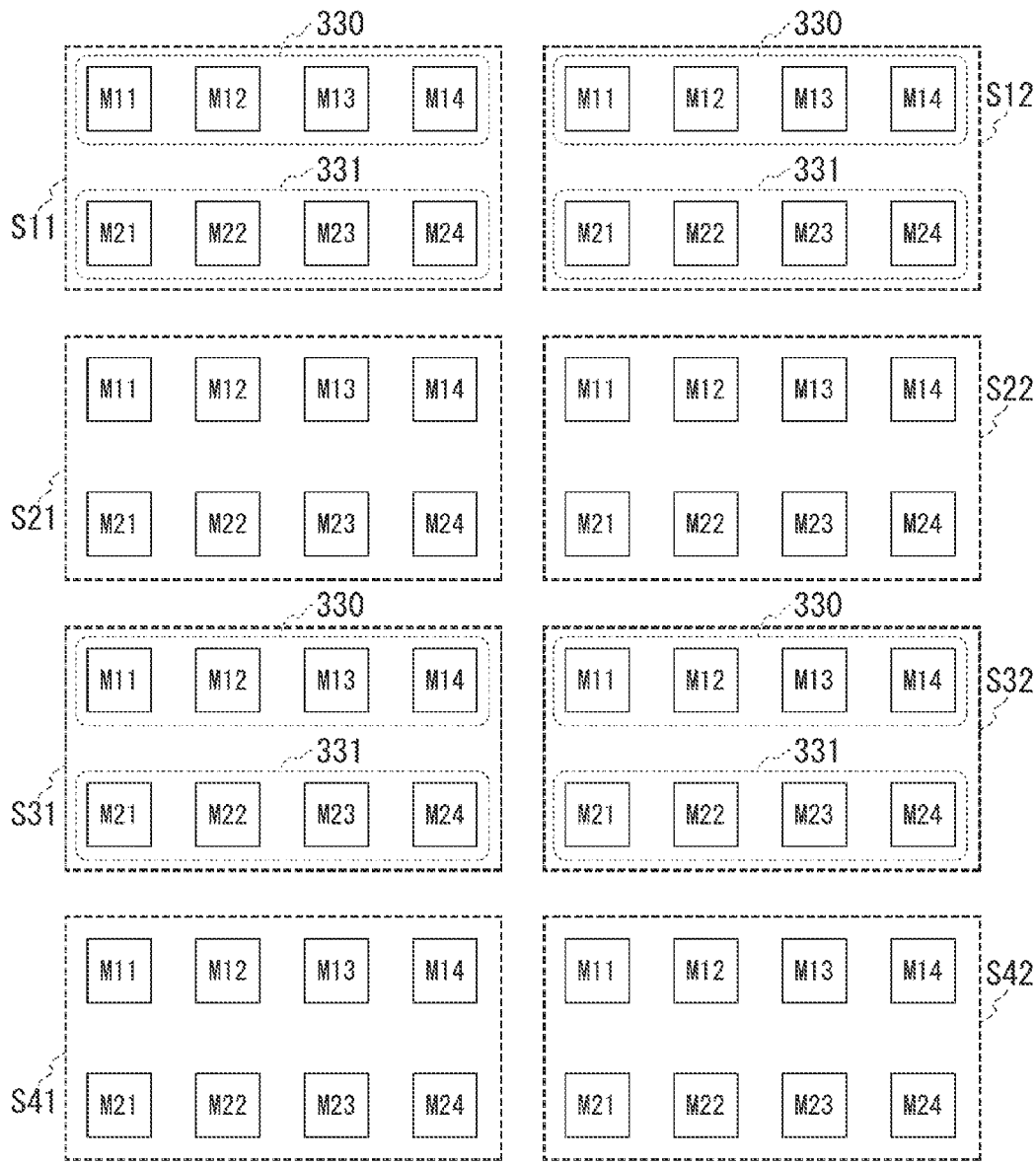
FIG. 19 is a diagram illustrating an array of memory units of the pixel unit included in the solid-state imaging device according to the first and third embodiments of the present invention.

FIG. 18 schematically illustrates an array of photoelectric conversion units 29a. FIG. 19 schematically illustrates an array of memory units 29b. FIG. 18 illustrates an array of photoelectric conversion units 29a viewed from one direction (e.g., a light incidence direction) in a plane. FIG. 19 illustrates an array of memory units 29b viewed from one direction (e.g., a light incidence direction) in a plane. That is, FIGS. 18 and 19 illustrate the units when viewed from the same direction. Shared pixel groups S11, S12, S21, S22, S31, S32, S41, and S42 are provided in respective corresponding positions of the array of the photoelectric conversion unit 29a and the array of the memory units 29b.

As illustrated in FIG. 18, the shared pixel groups S11, S12, S21, S22, S31, S32, S41, and S42 include photoelectric conversion units Rr1, Rr2, Bb1, Bb2, Gr1, Gr2, Gb1 and Gb2 as the photoelectric conversion units 29a. The photoelectric conversion units Rr1, Rr2, Bb1, Bb2, Gr1, Gr2, Gb1 and Gb2 are arranged according to a so-called Bayer array format.

As illustrated in FIG. 19, the shared pixel groups S1, S12, S21, S22, S31, S32, S41, and S42 include memory units M11, M12, M13, M14, M21, M22, M23 and M24 as the memory units 29b. The photoelectric conversion units 29a (the photoelectric conversion units Rr1, Rr2, Bb1, Bb2, Gr1, Gr2, Gb1 and Gb2) included in the same shared pixel group and the memory units 29b (the memory units M11, M12, M13, M14, M21, M22, M23 and M24) have a corresponding relationship.

Further, FIGS. 18 and 19 illustrate an output target pixel. The output target pixels 320 and 321 of FIG. 18 and the output target pixels 330 and 331 of FIG. 19 are output target pixels of the present variant. Each of the output target pixels 320 and 321, 330, 331 includes four pixels 29.

The output target pixel 320 includes pixels 29 in two rows and two columns. The output target pixel 320 includes the photoelectric conversion units Rr1, Bb1, Gr1, and Gb1. The output target pixel 321 includes pixels 29 in two rows and two columns. The output target pixel 321 includes the photoelectric conversion units Rr2, Bb2, Gr2, and Gb2. The output target pixel 330 includes pixels 29 in one row and four columns. The output target pixel 330 includes the memory units M11, M12, M13, and M14. The output target pixel 331 includes pixels 29 in one row and four columns. The output target pixel 331 includes the memory units M21, M22, M23 and M24.

The output target pixel 320 and the output target pixel 330 included in the same shared pixel group have a correspondence relationship. That is, signal charges generated by the photoelectric conversion elements of the photoelectric conversion units Rr1, Bb1, Gr1, and Gb1 of the output target pixel 320 are output to the memory units M11, M12, M13, and M14 of the output target pixel 330 included in the same shared pixel group as the shared pixel group including the output target pixel 320.

Further, the output target pixel 321 and the output target pixel 331 included in the same shared pixel group have a correspondence relationship. That is, signal charges generated by the photoelectric conversion elements of the photoelectric conversion units Rr2, Bb2, Gr2, and Gb2 of the output target pixel 321 are output to the memory units M21, M22, M23 and M24 of the output target pixel 331 included in the same shared pixel group as the shared pixel group including the output target pixel 321.

Figure 20:
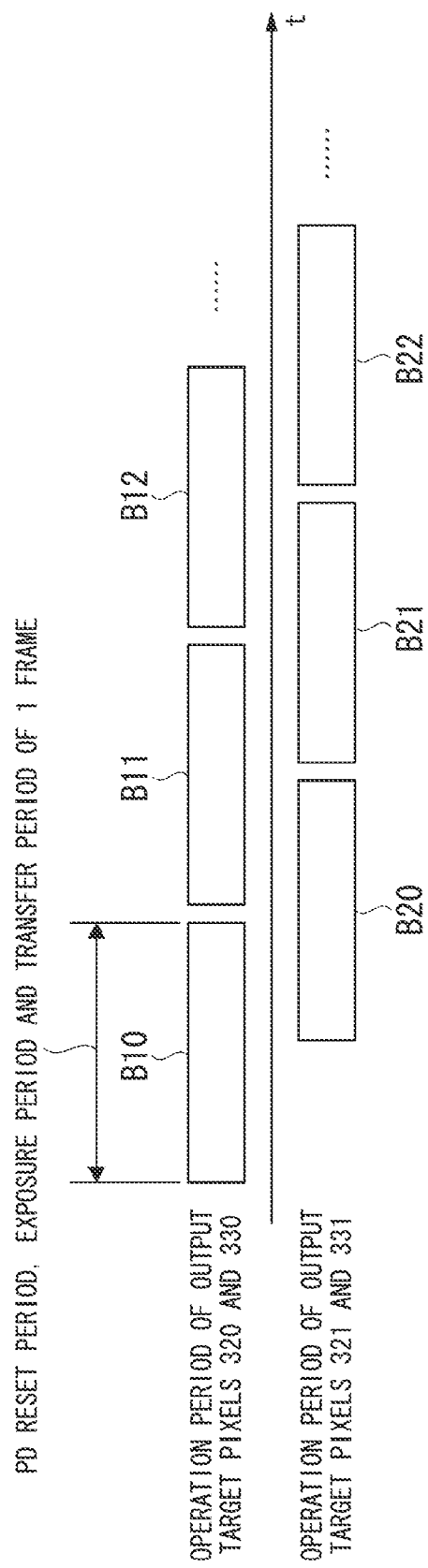
FIG. 20 is a timing chart illustrating another operation of the solid-state imaging device according to the first and third embodiments of the present invention.
Figure 21:
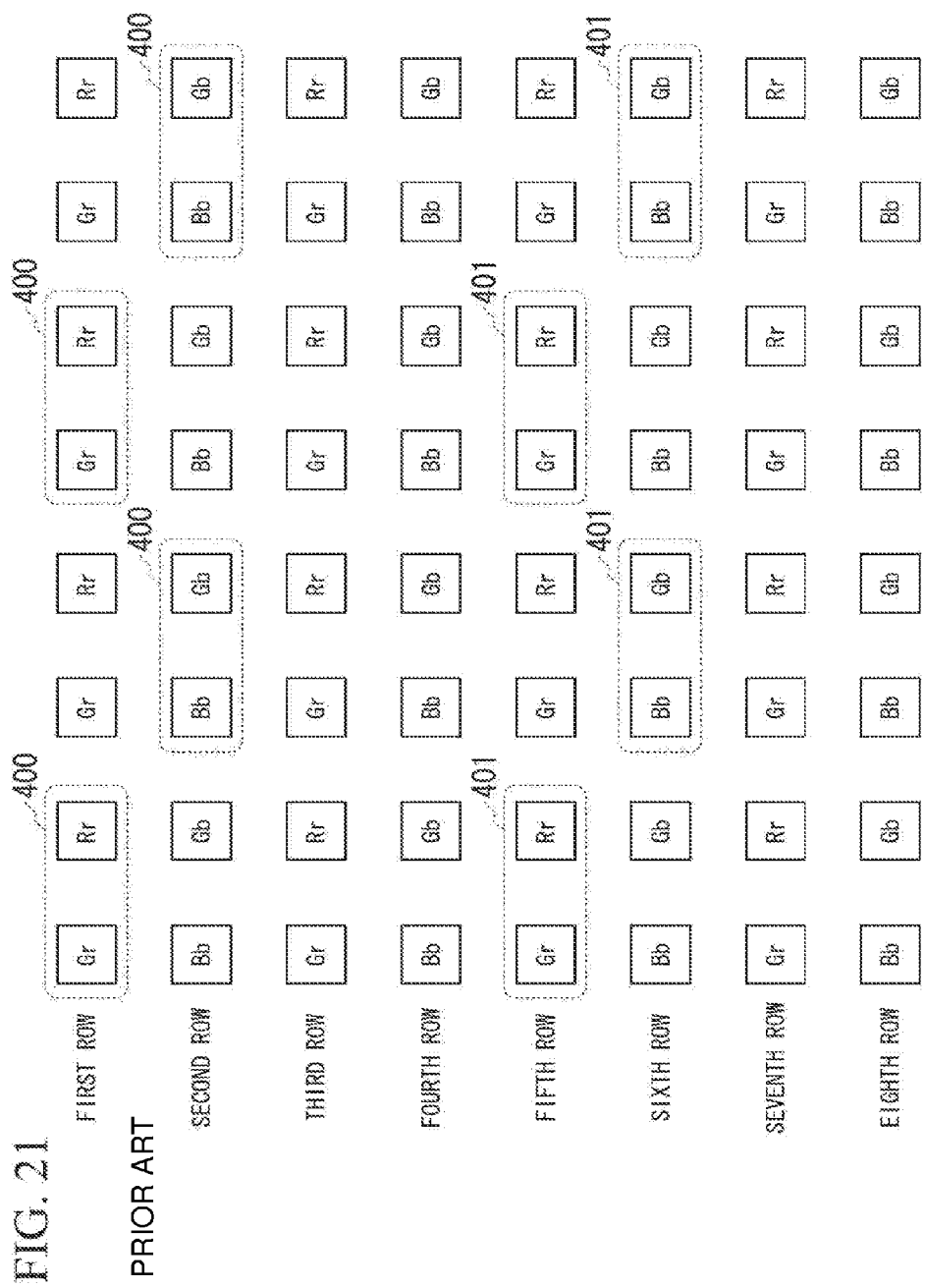
FIG. 21 is a diagram illustrating a method of reading a pixel signal in a conventional solid-state imaging device.

FIG. 20 illustrates a method of driving the solid-state imaging device 2 in the present embodiment. A horizontal direction of FIG. 20 illustrates time. Blocks B10, 5311, and B2 indicate periods in which the output target pixels 320 and 330 operate. Blocks B20, B211, and B12 indicate periods in which the output target pixels 320 and 330 operate. Blocks B20, B21, and B22 indicate periods in which the output target pixels 321 and 331 operate. The periods indicated by the blocks include a PD reset period, an exposure period, and a transfer period necessary to obtain the pixel signal of one frame.

After operation in the block B10 related to the output target pixels 320 and 330 starts and before operation in the block B10 ends, operation in the block B20 related to the output target pixels 321 and 331 starts. Further, before the operation in the block B20 ends, operation in the block B11 related to the output target pixels 320 and 330 starts. Thus, operation related to the output target pixels 320 and 330 and operation related to the output target pixels 321 and 331 are performed in parallel while shifting the respective operations in terms of time. Reading of the pixel signal from the output target pixel 330 is performed after the transfer period ends and before the pixel signal is read from the output target pixel 331. Further, reading of the pixel signal from the output target pixel 331 is performed after the transfer period ends and before the pixel signal is read from the output target pixel 330.

In the same shared pixel group, operation related to the output target pixels 320 and 330 and operation related to the output target pixels 321 and 331 are controlled not to be simultaneous. Specifically, in the same shared pixel group, signal charges generated by the photoelectric conversion unit 29a in the output target pixel 320 are transferred to the memory unit 29b in the output target pixel 330, and then signal charges generated by the photoelectric conversion unit 29a in the output target pixel 321 are transferred to the memory unit 29b in the output target pixel 331. For example, in the shared pixel group S11, signal charges generated by the photoelectric conversion units Gr1, Rr1, Bb1 and Gb1 in the output target pixel 320 are transferred to the memory units M11, M12, M13, and M14 in the output target pixel 330, and then signal charges generated by the photoelectric conversion units Gr2, Rr2, Bb2, and Gb2 in the output target pixel 321 are transferred to the memory units M21, M22, M23 and M24 in the output target pixel 331.

Further, in the same shared pixel group, operations in the transfer period of one frame and the reset period of a next frame related to the output target pixels 321 and 331 are performed between the reset period and the transfer period of one frame related to the output target pixels 320 and 330, i.e., in the exposure period. For example, in the shared pixel group S11, operation in the transfer period of the block B20 related to the output target pixels 321 and 331 and operation in the reset period of the block B21 related to the output target pixels 321 and 331 are performed in the exposure period in the block B11 related to the output target pixels 320 and 330.

Similarly, in the same shared pixel group, operations in a transfer period for one frame and a reset period for a next frame related to the output target pixels 320 and 330 are performed between the reset period and the transfer period of one frame related to the output target pixels 321 and 331, i.e., in the exposure period. For example, in the shared pixel group S11, operation in the transfer period of the block B10 related to the output target pixels 320 and 330 and operation in the reset period of the block B related to the output target pixels 320 and 330 are performed in the exposure period of the block B20 related to the output target pixels 321 and 331.

In the operation illustrated in FIG. 20, pixel signals of a plurality of frames can be obtained from the output target pixel 330 and the output target pixel 331. Accordingly, an image signal for live view used for display and recording of a moving image can be obtained from the pixel signals of the plurality of frames.

Further, operation related to the output target pixels 320 and 330 and operation related to the output target pixels 321 and 331 are performed in parallel while shifting the respective operations in terms of time. Accordingly, the pixel signal from the output target pixel 330 and the pixel signal from the output target pixel 331 can be alternately obtained at intervals shorter than a time of a normal one-frame period. Thus, it is possible to obtain an image signal for live view in which the motion of a moving subject becomes smoother due to the same effects as a case in which imaging is performed at a high frame rate.

While the embodiments of the present invention have been described above in detail with reference to the drawings, a concrete configuration is not limited to the above embodiments, and a design change is included without departing from the scope and spirit of the present invention. In the above description, the configuration of the solid-state imaging device in which the two substrates are connected by the connection part is shown. However, three or more substrates may be connected by the connection part. In the case of a solid-state imaging device in which the three or more substrates are connected by the connection part, two of the three or more substrates correspond to the first substrate and the second substrate.

For example, a solid-state imaging device according to one aspect of the present invention may be "a solid-state imaging device including:

a pixel unit in which pixels each including a photoelectric conversion element and a signal accumulation circuit are arranged in a matrix shape and a plurality of pixels in a range of two or more rows form the same group; and control means that performs control to associate a plurality of photoelectric conversion elements that are targets from which signals are read in the same group with a plurality of signal accumulation circuits in the same group of an array having a number of rows smaller than the number of rows in an array of the plurality of photoelectric conversion elements, transfer signals generated by the plurality of photoelectric conversion elements to the signal accumulation circuits associated with the respective photoelectric conversion elements, and output the signals accumulated in the signal accumulation circuits for each row."

For example, an imaging apparatus according to one aspect of the present invention may be "an imaging apparatus including:

a pixel unit in which pixels each including a photoelectric conversion element and a signal accumulation circuit are arranged in a matrix shape and a plurality of pixels in a range of two or more rows form the same group; and control means that performs control to associate a plurality of photoelectric conversion elements that are targets from which signals are read in the same group with a plurality of signal accumulation circuits in the same group of an array having a number of rows smaller than the number of rows in an array of the plurality of photoelectric conversion elements, transfer signals generated by the plurality of photoelectric conversion elements to the signal accumulation circuits associated with the respective photoelectric conversion elements, and output the signals accumulated in the signal accumulation circuits for each row."

A computer program product for realizing any combination of the components or the processes described above is also valid as an aspect of the present invention. The computer program product refers to a recording medium, an apparatus, a device, or a system in which program code has been incorporated, such as a recording medium (a DVD medium, a hard disk medium, a memory medium, or the like) having program code recorded thereon, a computer having program code recorded thereon, and an Internet system (e.g., a system including a server and a client terminal) having program code recorded thereon. In this case, the above-described components or processes are mounted in modules, and program code including the mounted modules is recorded in the computer program product.

For example, a computer program product according to one aspect of the present invention may be "a computer program product having a program code recorded thereon, the program code for causing a computer to execute a process of reading signals from pixels of a solid-state imaging device, the solid-state imaging device including a pixel unit in which pixels each including a photoelectric conversion element and a signal accumulation circuit are arranged in a matrix shape and a plurality of pixels in a range of two or more rows form the same group, the program code including:

a module that generates signals by a plurality of photoelectric conversion elements that are targets from which signals are read in the same group;

a module that associates the plurality of photoelectric conversion elements with a plurality of signal accumulation circuits in the same group of an array having a number of rows smaller than a number of rows in an array of the plurality of photoelectric conversion elements, and transfers the signals generated by the plurality of photoelectric conversion elements to the signal accumulation circuits associated with the respective photoelectric conversion elements; and a module that outputs the signals accumulated in the signal accumulation circuits for each row."

A program for realizing any combination of the components or the processes according to the above-described embodiment is also valid as an aspect of the present invention. The object of the present invention can be achieved by recording the program in a computer-readable recording medium and reading and executing the program recorded in the recording medium by a computer.

Here, the "computer" also includes a homepage providing environment (or a display environment) when using a WWW system. Also, the "computer-readable recording medium" includes a portable medium such as a flexible disk, a magnetic optical disc, a ROM, or CD-ROM, and a storage device such as a hard disk embedded in a computer. Also, the "computer-readable recording medium" includes a medium that stores a program for a predetermined time, like a volatile memory (RAM) in a computer system consisting of a server and a client when a program is transmitted via a network such as the Internet or a communication line such as telephone line.

Further, the above-described program may be transmitted from a computer in which the program is stored in a storage device, etc. to other computers via a transmission medium or by a transmission wave in the transmission medium. Here, the "transmission medium" for transmitting the program refers to a medium having a function of transmitting information, such as a network (communication network) such as the Internet or a communication line such as a telephone line. Also, the above-described program may be a program for realizing some of the above-described functions. Alternatively, the program may be a program capable of realizing the above-described functions through a combination with a program previously stored in a computer system, i.e., a differential file (a differential program).

While the preferred embodiments of the present invention have been described above, various alternatives, variations, and equivalents may be used as each component or each process described above. In the embodiments disclosed in the present disclosure, one part may be substituted with a plurality of parts or a plurality of parts may be substituted with one part to execute one or a plurality of functions. Such substitutions fall in a range of the present invention unless the substitutions do not appropriately act in order to achieve the object of the present invention. Accordingly, the range of the present invention is not determined with reference to the above description, but may be determined by claims, including an entire scope of equivalents. In the claims, each component includes one or more components, unless explicitly stated otherwise. It should not be construed that the claims include means-plus-function limitations unless explicitly described using phrases such as "means for ~" in the claims.

The terminology used in the present disclosure is for the purpose of describing particular embodiments only and is not intended to be limiting of the present invention. In this disclosure, the singular forms "a," "an" and "the" are intended to include the plural forms as well, unless the context clearly indicates otherwise. While the preferred embodiments of the present invention have been described above, the present invention is not limited to the embodiments. Additions, omissions, substitutions, and other variations of the configuration may be made to the present invention without departing from the scope and spirit of the present invention. The present invention is not limited by the above description, and is only limited by the claims.

What is claimed is:

1. A solid-state imaging device comprising:
  a pixel unit in which pixels each including a photoelectric conversion element and a signal accumulation circuit are arranged in a matrix shape and a plurality of pixels in a range of two or more rows form the same group; and
  a control unit that performs control to associate a plurality of photoelectric conversion elements that are targets from which signals are read in the same group with a plurality of signal accumulation circuits in the same group of an array having a number of rows smaller than a number of rows in an array of the plurality of photoelectric conversion elements, transfer signals generated by the plurality of photoelectric conversion elements to the signal accumulation circuits associated with the respective photoelectric conversion elements, and output the signals accumulated in the signal accumulation circuits for each row.

2. The solid-state imaging device according to claim 1, wherein:
  the control unit performs control to
  associate a plurality of first photoelectric conversion elements that are targets from which signals are read in the same group with a plurality of first signal accumulation circuits in the same group of an array having a number of rows smaller than a number of rows of an array of the plurality of first photoelectric conversion elements, transfer signals generated by the plurality of first photoelectric conversion elements to the first signal accumulation circuits associated with the plurality of respective first photoelectric conversion elements, associate a plurality of second photoelectric conversion elements other than the plurality of first photoelectric conversion elements in the same group with a plurality of second signal accumulation circuits in the same group of an array having a number of rows smaller than a number of rows in an array of the plurality of second photoelectric conversion elements, transfer signals generated by the plurality of second photoelectric conversion elements to the second signal accumulation circuit associated with the plurality of respective second photoelectric conversion elements, and output the signals accumulated in the first signal accumulation circuits for each row.

3. The solid-state imaging device according to claim 2, wherein the control unit does not perform output of the signals accumulated in the second signal accumulation circuits.

4. The solid-state imaging device according to claim 1, wherein:

the control unit associates all of the plurality of photoelectric conversion elements that are targets from which signals are read in the same group with a plurality of signal accumulation circuits in the same group of an array having a number of rows smaller than a number of rows in an array of the plurality of photoelectric conversion elements, and transfers the signals generated by the plurality of photoelectric conversion elements to the plurality of signal accumulation circuit associated with the plurality of photoelectric conversion elements.

5. The solid-state imaging device according to claim 4, wherein:

the control unit adds the signals generated by the plurality of photoelectric conversion elements, and transfers the added signal to the one signal accumulation circuit associated with the plurality of photoelectric conversion elements.

6. The solid-state imaging device according to claim 5, wherein:

the photoelectric conversion element generates a signal corresponding to any one of a plurality of colors; and the added signal is the same color signal.

7. The solid-state imaging device according to claim 1, wherein:

the array of the pixels corresponds to a Bayer array including first green, second green, red and blue; and the control unit performs control to associate the photoelectric conversion elements arranged in two rows and two columns that are targets from which signals are read in the same group with the signal accumulation circuit arranged in one row and four columns in the same group, transfer the signals generated by the photoelectric conversion elements arranged in two rows and two columns to the signal accumulation circuits arranged in one row and four columns associated with the respective photoelectric conversion elements, and output the signals accumulated in the signal accumulation circuits for each row.

8. The solid-state imaging device according to claim 7, wherein:

the photoelectric conversion elements arranged in two rows and two columns include two photoelectric conversion elements corresponding to the first green and the red arranged in the first row, and two photoelectric conversion elements corresponding to the blue and the second green arranged in the second row; and the signal accumulation circuits arranged in one row and four columns include four signal accumulation circuits corresponding to the first green, the red, the blue and the second green.

9. The solid-state imaging device according to claim 1, wherein:

a first substrate and a second substrate are electrically connected by a connection part, the photoelectric conversion elements are arranged in the first substrate, the signal accumulation circuits are arranged in the second substrate, and the control unit performs control to:

associate the plurality of photoelectric conversion elements that are targets from which signals are read in the same group with the plurality of signal accumulation circuits in the same group of an array having a number of rows smaller than a number of rows in an array of the plurality of photoelectric conversion elements, transfer the signals generated by the plurality of photoelectric conversion elements to the signal accumulation circuits associated with the respective photoelectric conversion elements via the connection part, and output the signals accumulated in the signal accumulation circuits for each row.

10. The solid-state imaging device according to claim 1, wherein:

the pixel further includes an amplification circuit that amplifies the signal generated by the photoelectric conversion element; and the signal accumulation circuit accumulates an amplification signal amplified by the amplification circuit.

11. The solid-state imaging device according to claim 1, wherein:

the control unit is configured to perform first control to associate a plurality of first photoelectric conversion elements that are targets from which signals are read in the same group with a plurality of first signal accumulation circuits in the same group of an array having a number of rows smaller than a number of rows of an array of the plurality of first photoelectric conversion elements, and transfer signals generated by the plurality of first photoelectric conversion elements to the first signal accumulation circuits associated with the respective first photoelectric conversion elements, and second control to associate a plurality of second photoelectric conversion elements that are targets from which signals are read in the same group with a plurality of second signal accumulation circuits in the same group of an array having a number of rows smaller than a number of rows in an array of the plurality of second photoelectric conversion elements, and transfer signals generated by the plurality of second photoelectric conversion elements to the second signal accumulation circuits associated with the respective second photoelectric conversion elements; and when the first control and the second control are performed, the second control related to one frame starts after the first control related to one frame starts and before the first control related to one frame ends.

12. The solid-state imaging device according to claim 11, wherein the control unit performs the first control and the second control so that a period in which the signal generated by the first photoelectric conversion element is transferred to the first signal accumulation circuit and a period in which the signal generated by the second photoelectric conversion element is transferred to the second signal accumulation circuit do not overlap.

13. The solid-state imaging device according to claim 12, wherein:

after resetting the first photoelectric conversion element in relation to reading of a signal of a first frame, the control unit performs control to transfer the signal generated by the second photoelectric conversion element to the second signal accumulation circuit in relation to reading of a signal of a second frame in a period until the signal generated by the first photoelectric conversion element is transferred to the first signal accumulation circuit, and control to reset the second photoelectric conversion element in relation to reading of a signal of a third frame.

14. An imaging apparatus comprising:

a pixel unit in which pixels each including a photoelectric conversion element and a signal accumulation circuit are arranged in a matrix shape and a plurality of pixels in a range of two or more rows form the same group; and a control unit that performs control to associate a plurality of photoelectric conversion elements that are targets from which signals are read in the same group with a plurality of signal accumulation circuits in the same group of an array having a number of rows smaller than a number of rows in an array of the plurality of photoelectric conversion elements, transfer signals generated by the plurality of photoelectric conversion elements to the signal accumulation circuits associated with the respective photoelectric conversion elements, and output the signals accumulated in the signal accumulation circuits for each row.

15. A signal reading method of reading signals from pixels of a solid-state imaging device, the solid-state imaging device including a pixel unit in which pixels each including a photoelectric conversion element and a signal accumulation circuit are arranged in a matrix shape and a plurality of pixels in a range of two or more rows form the same group, the method comprising:

generating signals by a plurality of photoelectric conversion elements that are targets from which signals are read in the same group;

associating the plurality of photoelectric conversion elements with a plurality of signal accumulation circuits in the same group of an array having a number of rows smaller than a number of rows in an array of the plurality of photoelectric conversion elements, and transferring the signals generated by the plurality of photoelectric conversion elements to the signal accumulation circuits associated with the respective photoelectric conversion elements; and outputting the signals accumulated in the signal accumulation circuits for each row.

* * * * *